(12) United States Patent
Abe et al.

(10) Patent No.: US 11,021,906 B2
(45) Date of Patent: Jun. 1, 2021

(54) PRODUCTION METHOD FOR FORMING MULTIPLE PANE AND MULTIPLE PANES

(71) Applicant: PANASONIC INTELLECTUAL PROPERTY MANAGEMENT CO., LTD., Osaka (JP)

(72) Inventors: Hiroyuki Abe, Osaka (JP); Masataka Nonaka, Osaka (JP); Eiichi Uriu, Osaka (JP); Kenji Hasegawa, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 306 days.

(21) Appl. No.: 15/981,746

(22) Filed: May 16, 2018

(65) Prior Publication Data

US 2018/0283087 A1    Oct. 4, 2018

Related U.S. Application Data

(60) Division of application No. 14/546,992, filed on Nov. 18, 2014, now Pat. No. 10,024,098, which is a
(Continued)

(30) Foreign Application Priority Data

May 18, 2012    (JP) ................................ 2012-114979

(51) Int. Cl.
*E06B 3/677* (2006.01)
*C03C 27/06* (2006.01)
(Continued)

(52) U.S. Cl.
CPC .............. *E06B 3/677* (2013.01); *C03C 27/06* (2013.01); *E06B 3/6612* (2013.01);
(Continued)

(58) Field of Classification Search
CPC ............................... E06B 3/677; E06B 3/6775
See application file for complete search history.

(56) References Cited

U.S. PATENT DOCUMENTS 5,664,395 A    9/1997  Collins et al.
5,820,435 A    10/1998  Cooper et al.
(Continued)

FOREIGN PATENT DOCUMENTS

JP    7-508967 A    10/1995
JP    10-002161 A    1/1998
(Continued)

OTHER PUBLICATIONS

International Search Report issued in International Application No. PCT/JP2013/003128 dated Aug. 20, 2013, with English translation.
(Continued)

*Primary Examiner* — Philip C Tucker
*Assistant Examiner* — John Blades
(74) *Attorney, Agent, or Firm* — McDermott Will and Emery LLP

(57) ABSTRACT

The objective is to propose a production method of multiple panes which can be simple and nevertheless produce a multiple pane in its finished state which does not include any undesired protrusion from an external surface of a glass panel. The production method includes: hermetically bonding, with a sealing member, peripheries of paired glass panels disposed facing each other at a predetermined distance to form a space to be hermetically enclosed between the glass panels; evacuating air from the space through an outlet to make the space be in a reduced pressure state; and dividing, after the space is made be in the reduced pressure state, the space by a region forming member into an outlet region including the outlet and a reduced pressure region other than the outlet region.

13 Claims, 14 Drawing Sheets

Related U.S. Application Data continuation of application No. PCT/JP2013/003128, filed on May 16, 2013.

(51) Int. Cl.
  *E06B 3/66* (2006.01)
  *E06B 3/663* (2006.01)
  *E06B 3/673* (2006.01)

(52) U.S. Cl.
  CPC ........ *E06B 3/66304* (2013.01); *E06B 3/6775* (2013.01); *E06B 3/67334* (2013.01); *E06B 2003/66338* (2013.01); *Y02A 30/249* (2018.01); *Y02B 80/22* (2013.01)

(56) References Cited

U.S. PATENT DOCUMENTS

| | | | |
|---|---|---|---|
| 6,109,994 | A | 8/2000 | Cho et al. |
| 6,416,375 | B1 | 7/2002 | Cho et al. |
| 6,479,112 | B1 | 11/2002 | Shukuri et al. |
| 6,537,121 | B1 | 3/2003 | Baret |
| 6,827,623 | B2 | 12/2004 | Nakatake et al. |
| 2009/0151854 | A1 | 6/2009 | Cooper |

FOREIGN PATENT DOCUMENTS

| | | |
|---|---|---|
| JP | H10-297944 A | 11/1998 |
| JP | 11-311069 A | 11/1999 |
| JP | 2000-063157 A | 2/2000 |
| JP | 2000-510281 A | 8/2000 |
| JP | 2001-028240 A | 1/2001 |
| JP | 2001-342042 A | 12/2001 |
| JP | 2001-351525 A | 12/2001 |
| JP | 2002-008569 A | 1/2002 |
| JP | 2009-167041 A | 7/2009 |
| JP | 2011-506252 A | 3/2011 |
| WO | 91/02878 A1 | 3/1991 |
| WO | 98/26440 A1 | 6/1998 |
| WO | 2009/078912 A1 | 6/2009 |
| WO | 2010/061418 A1 | 6/2010 |

OTHER PUBLICATIONS

Extended European Search Report issued in corresponding European Patent Application No. 13791335.6, dated Jul. 15, 2015.
Non-Final Office Action issued in U.S. Appl. No. 14/546,992, dated May 16, 2017.
Final Office Action issued in U.S. Appl. No. 14/546,992, dated Dec. 14, 2017.
Notice of Allowance issued in U.S. Appl. No. 14/546,992, dated Mar. 7, 2018.

PRODUCTION METHOD FOR FORMING MULTIPLE PANE AND MULTIPLE PANES

CROSS-REFERENCE TO RELATED APPLICATIONS

The application is a divisional of U.S. patent application Ser. No. 14/546,992, filed on Nov. 18, 2014, now U.S. Pat. No. 10,024,098, which is a continuation of International Application No. PCT/JP2013/003128, filed on May 16, 2013, which claims the benefit of priority of Japanese Patent Application No. 2012-114979, filed on May 18, 2012, the entire contents of which are incorporated herein by reference.

TECHNICAL FIELD

The present disclosure relates to methods of producing multiple panes in which paired glass panels are stacked with a reduced pressure space in-between, and particularly relates to a production method of a multiple pane which an undesired protrusion such as an evacuation pipe used for pressure reduction does not remain after finishing.

BACKGROUND ART

There has been commercialized a multiple pane. In the multiple pane, a pair of glass panels are arranged facing each other, and a plurality of spacers are interposed between the pair of glass panels, and the pair of glass panels are bonded with a hermetically bonding member at peripheries thereof, and thus an inside space is defined by the pair of glass panels and the hermetically bonding. The air in the inside space is exhausted to reduce the pressure of the inside space.

It is expected that the multiple pane in which the pressure of the inside space is reduced shows great thermally insulating effects, dew prevention effects, and sound insulating effects, as a result of presence of a vacuum layer whose pressure is lower than the atmospheric pressure between the pair of glass panels, relative to a multiple pane constituted by two glass plate simply bonded to each other. Therefore, such multiple pane attracts great attentions as one of eco-glass in current situations in which the importance of energy strategy rises.

The multiple pane including the inside space with the reduced pressure is produced as follows: the peripheries of the pair of glass panels are hermetically bonded by applying the hermetically bonding seal of low-melting glass frit therebetween and heating them to hermetically bond the peripheries to form a space while a plurality of spacers of metal or ceramics are interposed to keep the predetermined distance between the glass panels, and thereafter air is evacuated from the space via an evacuation pipe of glass or metal. The multiple pane is produced through this production process, and thus the finished product of the multiple pane including the inside space with the reduced pressure includes the evacuation pipe whose tip is closed. Hence, in the multiple pane constituted by transparent glass panels, the evacuation pipe may cause problems that appearance becomes poor and the inside space cannot be kept in the reduced pressure state when the evacuation pipe is broken. In view of this, with regard to the multiple pane used as a window pane, for example, the multiple pane is used so that the evacuation pipe is positioned at the upper-right corner of the indoor side. In other words, the use of the multiple pane is limited so as to prevent visually and physically interference of the evacuation pipe.

In a technique which has been proposed as the conventional production method of multiple pane with the reduced pressure, an evacuation pipe is embedded into one of glass panels until a center in a thickness direction, and the evacuation pipe is sealed with shield for preventing a junction of the glass panel and the evacuation pipe from suffering from heat generated in sealing the evacuation pipe. According to this technique, the evacuation pipe remaining in the finished product is shortened (see patent literature [JP 10-2161 A1]). In another technique, an evacuation pipe and a vicinity of a part, on which the evacuation pipe is situated, of a rear surface of a glass panel are covered with a cover member of resin so as to form a gap between the cover member and a sealed tip of the evacuation pipe. According to this technique, breakage of the evacuation pipe caused by impacts from outside can be prevented (see patent literature 2 [JP 11-311069 A1]).

According to the conventional production method of multiple pane described above, in the finished product, the evacuation pipe becomes short, and thus the multiple pane can be easy in handling. External force directly acting on the evacuation pipe can be suppressed, and thus it is possible to prevent an unwanted situation where the reduced pressure state cannot be maintained due to breakage of the evacuation pipe. Therefore, the conventional production method can give advantageous effects to an extent.

However, for example, in the techniques disclosed in patent literature 1, it is necessary to form a recess in the glass panel and fix the evacuation pipe inside the recess in order to reduce an amount of part of the evacuation pipe protruding from the surface of the glass panel. Further, the shield disposed so that the temperature of the junction of the evacuation pipe and the glass plate becomes high at the time of sealing the evacuation pipe is necessary. Thus, the production process of multiple pane becomes more complex. Additionally, according to the technique disclosed in patent literature 2, it is necessary to add the cover member, and this causes an increase in the number of parts. Further, it is necessary to add a step of attaching the cover member to the rear surface, and this causes an increase in the number of steps. When the production process becomes more complex and the numbers of parts and steps increase, the production cost of the multiple pane tends to increase. Further, in the multiple panes formed by use of the above conventional techniques, the evacuation pipe still remains in the finished product. Hence, such a protrusion from the rear surface of the multiple pane is present and therefore there is a problem of appearance, it is very difficult to perfectly eliminate a risk in which the space formed by the pair of glass panels cannot be kept in the reduced pressure state when the evacuation pipe is broken.

SUMMARY

In view of the above circumstances, the present invention has aimed to propose a production method of multiple panes which can be simple and nevertheless produce a multiple pane in its finished state which does not include any undesired protrusion from an external surface of a glass panel.

The production method of multiple panes of the present disclosure includes: hermetically bonding, with a hermetically-bonding member, peripheries of paired glass panels disposed facing each other at a predetermined distance to form a space to be hermetically enclosed between the glass panels; evacuating air from the space through an outlet to make the space be in a reduced-pressure state; and dividing, after the space is made be in the reduced-pressure state, the space by a region forming member into an outlet region including the outlet and a reduced-pressure region other than the outlet region.

In the production method of multiple panes of the present disclosure, the space formed between the pair of glass panels hermetically bonded with the hermetically-bonding member is made be in the reduced pressure state, and subsequently the space is divided by the region forming member into the outlet region and the reduced-pressure region. Hence, even when an evacuation pipe used for evacuation is removed for example, the reduced-pressure region is kept in the reduced-pressure state. Therefore, it is possible to easily produce a finished product of a multiple pane which does not include any undesired protrusion protruded from an external surface of a glass panel.

Figure 1:
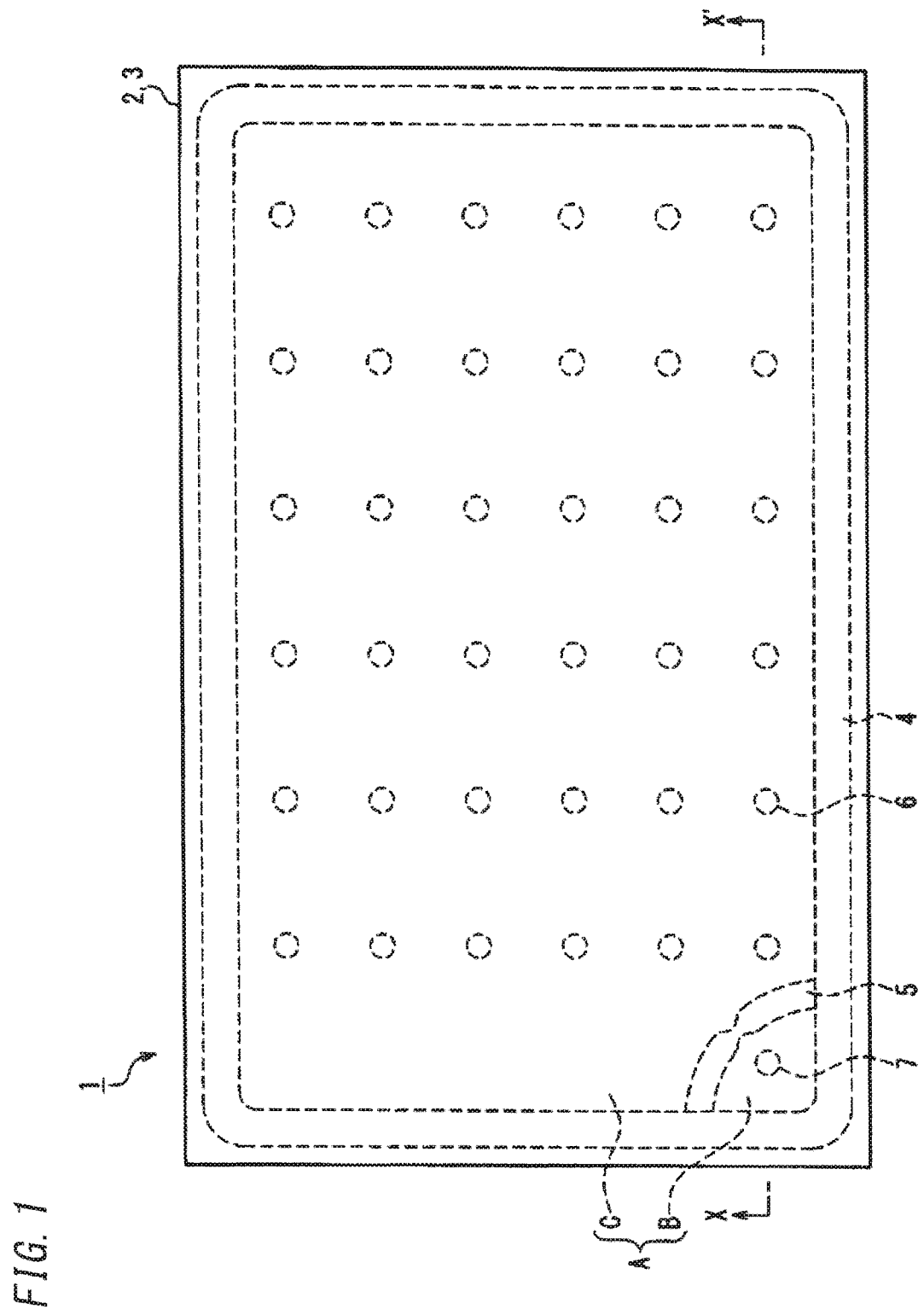
FIG. 1 is a plan illustrating a configuration example of a multiple pane with an inside space having a reduced pressure which is produced by the production method of multiple panes of the present disclosure.

The figures depict one or more implementation in accordance with the present teaching, by way of example only, not by way of limitations.

DETAILED DESCRIPTION

The production method of multiple panes of the present disclosure includes: hermetically bonding, with a hermetically-bonding member, peripheries of paired glass panels disposed facing each other at a predetermined distance to form a space to be hermetically enclosed between the glass panels; evacuating air from the space through an outlet to make the space be in a reduced-pressure state; and dividing, after the space is made be in the reduced-pressure state, the space by a region forming member into an outlet region including the outlet and a reduced-pressure region other than the outlet region.

In the production method of multiple panes, after the space between the pair of glass panels whose peripheries are hermetically bonded with the hermetically-bonding member is made be in the reduced-pressure state, the space is divided into the outlet region and the reduced-pressure region by the region forming member. According to the production method of this present disclosure, the space between the pair of glass panels made be in the reduced-pressure state is divided into the outlet region and the reduced-pressure region by the region forming member. Therefore, even when an evacuation pipe used for evacuation is removed thereafter, it is possible to keep the reduced-pressure region in the reduced-pressure state. Consequently, it is possible to produce a multiple pane which can keep desired properties such as thermally insulating properties, dew condensation prevention properties, and sound insulating properties and nevertheless does not include any undesired protrusion from an external surface of a glass panel.

Note that, in the present description, the phrase that the pressure of the space between the pair of glass panels is reduced means that the space between the pair of glass panels is made be in a state in which the pressure is lower than an outside atmospheric pressure. Further, the reduced-pressure state in the present description means a state in which the pressure of an inside of the space is lower than the outside atmospheric pressure, and thus may include a so-called vacuum state obtained by reducing the pressure by evacuating air from the space, irrespective of the degree of vacuum. Further, a state resulting from evacuating air inside the space and then filling the space with at least one of various gases such as an inert gas is included in the reduced-pressure state of the present description, when the pressure of the gas inside the space is finally lower than the atmospheric pressure.

Further, in a preferable aspect of the production method of multiple panes of the above present disclosure, the region forming member includes an air passage interconnecting the outlet region and the reduced-pressure region under a condition where the space is formed; and after the space is made be in the reduced-pressure state, the space is divided into the outlet region and the reduced-pressure region by closing the air passage. According to this aspect, it is possible to easily divide the space into the outlet region and the reduced-pressure region after the space between the pair of glass panels is made be in the reduced-pressure state.

In this case, the air passage is an interval of the region forming member formed in a discontinuous shape, and after the space is made be in the reduced-pressure state, the interval can be closed by melting the region forming member.

Further, in another preferable aspect of the production method of multiple panes of the above present disclosure, a formation height of the region forming member before being melted is less than a formation height of the hermetically-bonding member before being melted; and after the space is made be in the reduced-pressure state under a condition where the pair of glass panels are hermetically bonded by melting the hermetically-bonding member, the space is divided into the outlet region and the reduced-pressure region by the region forming member by decreasing the distance between the pair of glass panels. According to this aspect, it is possible to easily divide the space in the reduced-pressure state into the outlet region and the reduced-pressure region by adjusting the distance between the pair of glass panels.

Further, in another preferable aspect, a melting temperature of the region forming member is higher than a melting temperature of the hermetically-bonding member; the space is formed by hermetically bonding the pair of glass panels at a temperature causing melting of the hermetically-bonding member to form the space; and after the space is made be in the reduced-pressure state, the space is divided into the outlet region and the reduced-pressure region by melting the region forming member at a temperature causing melting of the region forming member. According to this aspect, it is possible to easily divide the space in the reduced-pressure state into the outlet region and the reduced-pressure region by adjusting the melting temperatures of the region forming member and the hermetically-bonding member.

Further, in another preferable aspect, after the space is formed by conducting melting inside a furnace to melt the hermetically-bonding member, and subsequently the space is made be in the reduced-pressure state outside the furnace, the space is divided into the outlet region and the reduced-pressure region by conducting again melting inside the furnace to melt the region forming member. According to this aspect, the step of evacuating the space formed between the glass panels can be conducted at a lower temperature than the steps of melting the hermetically-bonding member and the region forming member. Therefore, the space can be evacuated to be in the reduced-pressure state by use of inexpensive and simple equipment.

Further, in another preferable aspect, the outlet is formed in at least one of the pair of glass panels. In another aspect, the space is made be in the reduced-pressure state by use of an evacuation pipe connected to the outlet; and the evacuation pipe is removed after the space is divided into the outlet region and the reduced-pressure region. According to each aspect, the multiple pane can be produced by use of manufacture equipment capable of reducing the pressure of the space through the evacuation pipe connected to the outlet.

Further, in another preferable aspect, the hermetically-bonding member and the region forming member are made from glass frit. The glass frit is generally used as seal for forming a hermetically enclosed space by melting the seal by heat, and consequently, the multiple pane can be produced at a lowered cost.

Further, in another preferable aspect, a spacer for keeping a gap between the pair of glass panels is disposed on a surface of at least one of the pair of glass panels. According to this aspect, it is possible to accurately keep the gap between the pair of glass panels and to produce a multiple pane with high resistance to external impacts.

Further, in another preferable aspect, a height keeping member for keeping a gap between the pair of glass panels is disposed at a portion on which the hermetically-bonding member is to be formed. According to this aspect, even at the peripheries at which the hermetically-bonding member is formed, the length of the gap between the pair of glass panels can be kept to a predetermined length.

Further, in another preferable aspect, at least one of the spacer and the height keeping member is formed by photolithography. By using the photolithography, the spacer or the height keeping member having a predetermined shape can be disposed accurately at a predetermined position.

Hereinafter, the method of producing multiple panes of the present disclosure is described with reference to the drawings.

Note that, for convenience of explanation, the drawings referred below relate to the production method of multiple panes of the present disclosure and the multiple pane produced by the method of the present disclosure, and illustrate in a simplified manner mainly portions necessary for describing the disclosure. Therefore, the multiple panes described with reference to the drawings may have any configuration which is not shown in the drawings referred. Furthermore, dimensions of members shown in the drawings do not necessarily reflect dimensions and dimensional ratios of members in practice, exactly.

First Embodiment

First, the configuration of the multiple pane produced by the production method of multiple panes of the present embodiment is described with reference to FIG. 1 and FIG. 2.

FIG. 1 is a plan illustrating a schematic configuration of a finished product of the multiple pane produced by the production method of the multiple pane of the present disclosure. Further, FIG. 2 is a section illustrating a schematic configuration of a finished product of the multiple pane produced by the production method of the multiple pane of the present disclosure. Note that, FIG. 2 is a view illustrating a sectional structure taken along line X-X' in FIG. 1.

Figure 2:
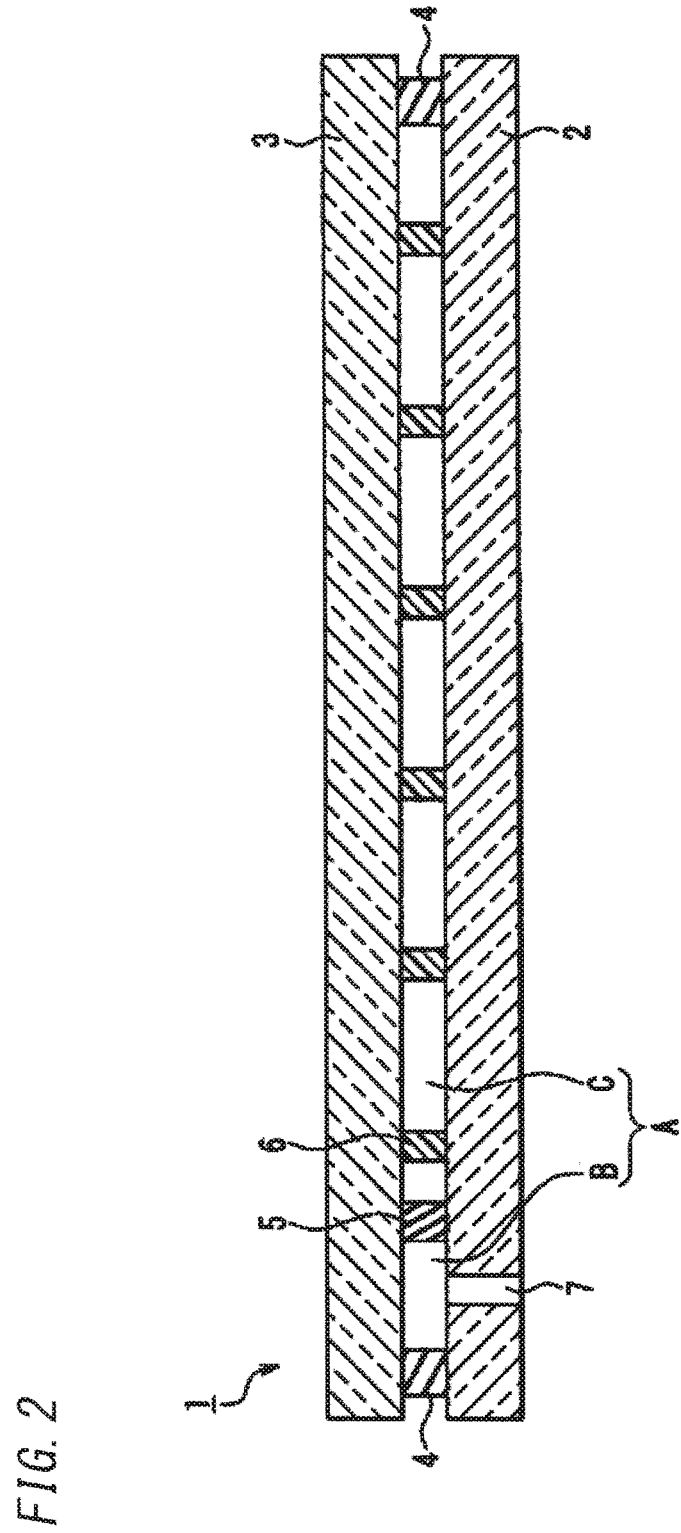
FIG. 2 is a section illustrating the configuration example of the multiple pane with the inside space having the reduced pressure which is produced by the production method of multiple panes of the present disclosure.

As shown in FIG. 1 and FIG. 2, the multiple pane 1 produced by the production method of the present disclosure includes: a rear glass panel 2 and a front glass panel 3 defined as paired glass panels disposed facing each other; and a frit seal 4 defined as a hermetically-bonding member hermetically bonding peripheries of the glass panels 2 and 3 so that a space A to be hermetically enclosed is formed between the glass panel 2 and the glass panel 3.

Note that, to keep a distance between the glass panel 2 and the glass panel 3 to a predetermined distance, spacers 6 are disposed on an inside of a region, on which the frit seal 4 is applied, of the rear glass panel 2.

In the production method of the multiple pane of the present embodiment, air inside the space A is evacuated through an outlet 7 of the rear glass panel 2 to make the space A be in a reduced-pressure state, and thereafter the space A is divided by, a partition 5 serving as a region forming member, into an outlet region B including the outlet 7 and a reduced-pressure region C defined as a region other than the outlet region. Therefore, in the multiple pane 1 in a finished-state shown in FIG. 1 and FIG. 2, the reduced-pressure state of the reduced-pressure region C can be maintained. Further, after the space A is divided into the outlet region B and the reduced-pressure region C by the partition 5, an evacuation pipe connected to the outlet 7 is removed. Hence, the outlet region B is spatially connected to the outside and thus the outlet region B is filled with air.

As described above, in the multiple pane 1 produced by the production method of the present embodiment, the reduced-pressure region C which occupies most of the space A formed between the pair of glass panels 2 and 3 is kept in the reduced-pressure state, and thereby properties (e.g., a thermally insulating effect, a dew condensation prevention effect, and a sound insulating effect) inherent to a multiple pane in which the pressure of the inside space is reduced can be obtained. Additionally, the evacuation pipe used for evacuating the space A has been removed, and therefore, as shown in FIG. 2, there is no protrusion protruded outside from the rear side of the glass panel 2 of the multiple pane 1, and consequently a disadvantage caused by the presence of the protruded evacuation pipe at the time of using and transferring the multiple pane 1 can be solved. Further, the evacuation pipe has been removed, and thus it is possible to avoid an undesired situation where the whole space between the glass panels 2 and 3 of the multiple pane 1 is not in the reduced-pressure state due to breakage of the evacuation pipe.

Hereinafter, the first example of the production method for the finished product of the multiple pane 1 described with reference to FIG. 1 and FIG. 2 is described as the production method of multiple panes of the present embodiment.

Figure 3:
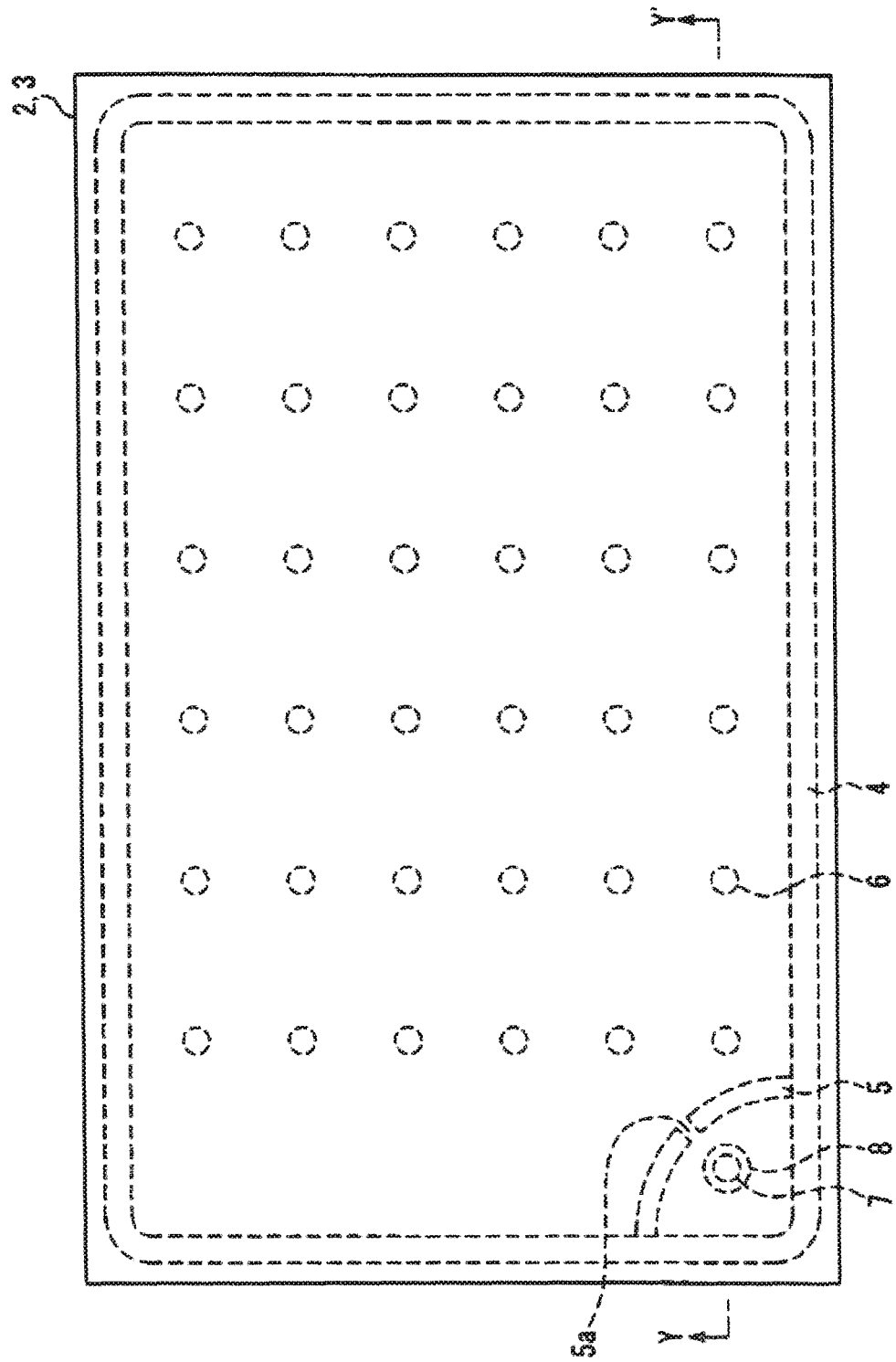
FIG. 3 is a plan which relates to the production method of multiple panes of the first embodiment and illustrates a state in which a hermetically-bonding member and a region forming member have not been melted yet.
Figure 4:
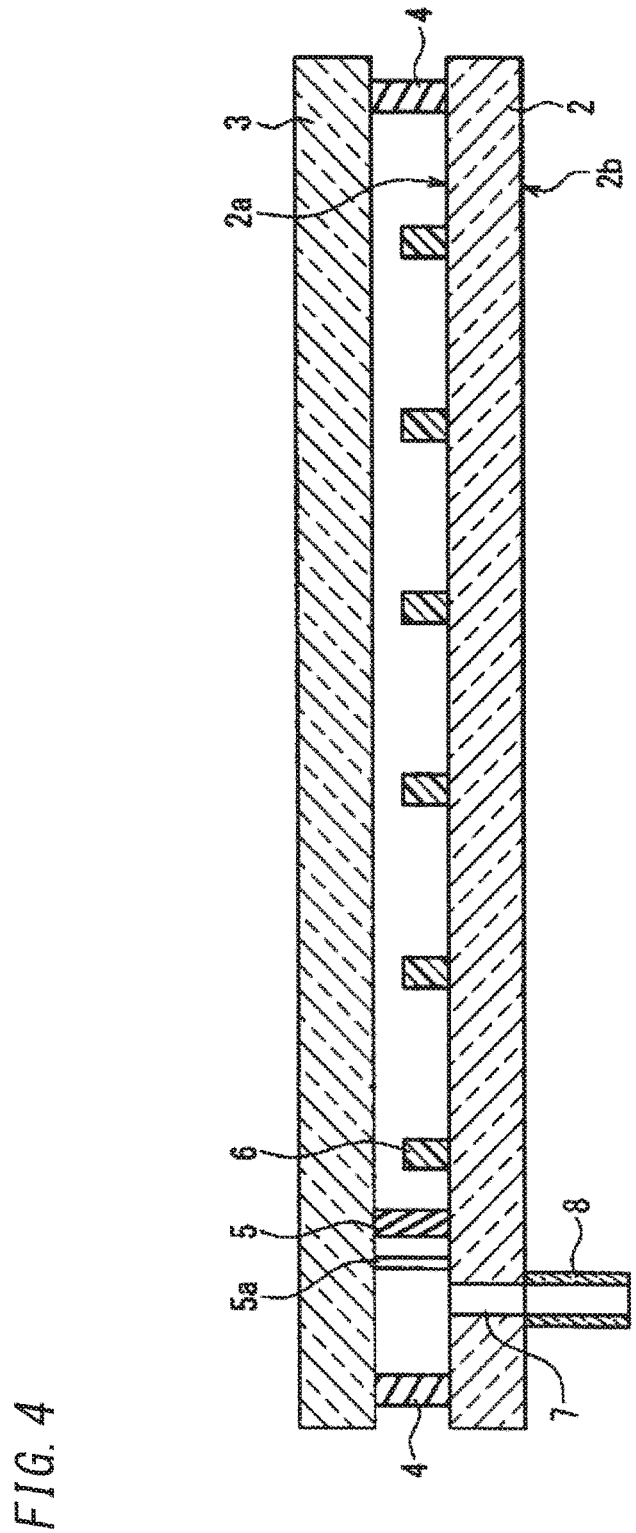
FIG. 4 is a section which relates to the production method of multiple panes of the first embodiment and illustrates the state in which the hermetically-bonding member and the region forming member have not been melted yet.

FIG. 3 and FIG. 4 are diagrams for describing the first example of the production method for the finished product of the multiple pane 1 described with reference to FIG. 1 and FIG. 2. FIG. 3 is a plan illustrating a state in which the rear glass panel 2 and the front glass panel 3 have not been hermetically bonded with the frit seal 4 yet. FIG. 4 is a section illustrating a state in which the rear glass panel 2 and the front glass panel 3 have not been hermetically bonded with the frit seal 4 yet. FIG. 4 is a view illustrating a sectional structure taken along line Y-Y' in FIG. 3.

As shown in FIG. 3 and FIG. 4, in the production method of multiple panes of the present embodiment, the frit seal 4 in a frame shape serving as the hermetically-bonding member is applied on a peripheral portion of a front surface 2a of the rear glass panel 2, which is a surface facing the front glass panel 3. Further, the outlet 7 penetrating through the glass panel 2 is formed in a vicinity of a corner of the rear glass panel 2. Additionally, an evacuation pipe 8 is provided to a rear surface 2b of the glass panel 2 to be connected to the outlet 7. Note that, in the multiple pane described in the present embodiment, the evacuation pipe 8 is made of glass, and an inner diameter of the evacuation pipe 8 is equal to a diameter of the outlet 7. The evacuation pipe 8 is connected to the outlet 7 by a conventional method such as glass welding and a method using molten metal used as welding material. Note that, the evacuation pipe 8 may be the aforementioned glass pipe or a metal pipe.

The glass panel used in the multiple pane used for explanation of the production method of the present embodiment may be selected from various glass panels made of soda-lime glass, high-strain glass, chemically toughened glass, non-alkali glass, quartz glass, Neoceram, physically toughened glass, and the like. Note that, in the present embodiment, examples of the glass panel 2 and the glass panel 3 have the same shape and the thickness. However, such glass panels may have different sizes and thicknesses. Further, the glass panel can be selected in accordance with its application from glass panels with various sizes including a glass panel which is several cm on a side and a glass panel which is in a range of about 2 to 3 m on a side at maximum. Additionally, the glass panel can be selected in accordance with its application from glass panels with various sizes including a glass panel with a thickness in a range of about 2 to 3 mm and a glass panel with a thickness of about 20 mm.

The partition 5 serving as the region forming member is formed on the front surface 2a of the glass panel 2 so that ends of the partition 5 are connected to the frit seal 4 so as to surround the outlet 7 together with the frit seal 4. In the present embodiment, the same low-melting frit glass is used for the frit seal 4 hermetically bonding the pair of glass panels 2 and 3 and the partition 5.

In more detail, by way of one example, it is possible to use a bismuth-based seal frit paste including: 60 to 75% of a glass component which is composed mostly of bismuth oxide and includes 70% or more of $Bi_2O_3$, 5 to 15% of each of $B_2O_3$ and ZnO, and 10% or less of other components; 20 to 30% of zinc-silica oxide; and 5 to 15% of a mixture of organic substances such as ethylcellulose, terpineol, and polyisoutyl methacrylate. This frit glass has a softening point of 434° C.

Note that, the frit glass used for the frit seal 4 and the partition 5 may be selected from lead-based frit and vanadium-based frit in addition to the bismuth-based frit. Further, seal made of low-melting metal or resin may be used for the hermetically-bonding member and the region forming member as an alternative to the frit glass.

In a state where the frit seal 4 and the partition 5 have not been melted yet, a slit 5a serving as an air passage is formed to penetrate through the partition 5, and the partition 5 is discontinuous at a part where this slit is formed. In other words, the slit 5a formed in the partition 5 spatially interconnects opposite parts of the space A formed by the pair of glass panels 2 and 3 and the frit seal 4 with regard to the partition 5.

A plurality of spacers 6 are arranged in lengthwise and width directions at regular intervals on the front surface 2a of the glass panel 2 so as to be positioned in an opposite side of the partition 5 from a side where the outlet 7 is formed. For example, each of the spacers 6 included in the multiple pane of the present embodiment has a cylindrical shape with a diameter of 1 mm and a height of 100 μm, and each of arrangement intervals in lengthwise and width directions is 2 cm. The shape of the spacer is not limited to the above cylindrical shape and may be selected from various types of shapes such as a prism shape and a spherical shape. Further, the size of the spacer, the number of arranged spacers, the interval of spacers, and the arrangement pattern of spacers are not limited to the aforementioned instances, and may be appropriately selected in accordance with the size and thickness of the glass panel to be used.

Further, in the production method of the present embodiment, the spacer 6 is made of photo-curable resin by photolithography before the frit seal 4 is applied on the front surface 2a of the glass panel 2, and in this photolithography, photo-curable resin is applied on the entire front surface 2a to form a film with a predetermined thickness, and thereafter the film is exposed to light with a mask so as to cure intend parts of the film to form the spacers 6, and then undesired part of the film is removed by washing. By using the photolithography in this manner, the spacers with the predetermined size and section can be disposed at the predetermined positions accurately. Note that, when the spacers 6 are made of transparent photo-curable resin, the spacers 6 can be less likely to be visually perceived when the multiple pane 1 is used.

The material of the spacer 6 is not limited to the aforementioned photo-curable resin, and may be selected from various materials which are not melted in a heating process described later. Further, instead of using the photolithography, spacers made of material such as metal can be dispersedly fixed or bonded at predetermined positions in the front surface 2a of the glass panel 2 on the rear side in a similar manner to a conventional multiple pane. Note that, when the formation and arrangement of the spacers are conducted without using the photolithography, it is preferable that the spacers be in a spherical or cuboidal shape. In this case, even when the spacers disposed on the surface of the glass panel are unintendedly directed in different directions, it is possible to accurately set the distance between the pair of glass panels.

Note that, the multiple pane produced by the production method of the present disclosure need not necessarily include the spacer, and may be devoid of the spacer. Further, the spacer may be formed on a surface of the glass panel on the front side facing inside.

As shown in FIG. 4, when the frit seal 4 and the partition 5 have not been melted yet, the frit seal 4 and the partition 5 are formed to be taller than the spacer 6. For this reason, the glass panel 3 on the front side is disposed on the tops of the frit seal 4 and the partition 5, and gaps are formed between the glass panel 3 and the tops of the spacers 6.

Figure 5:
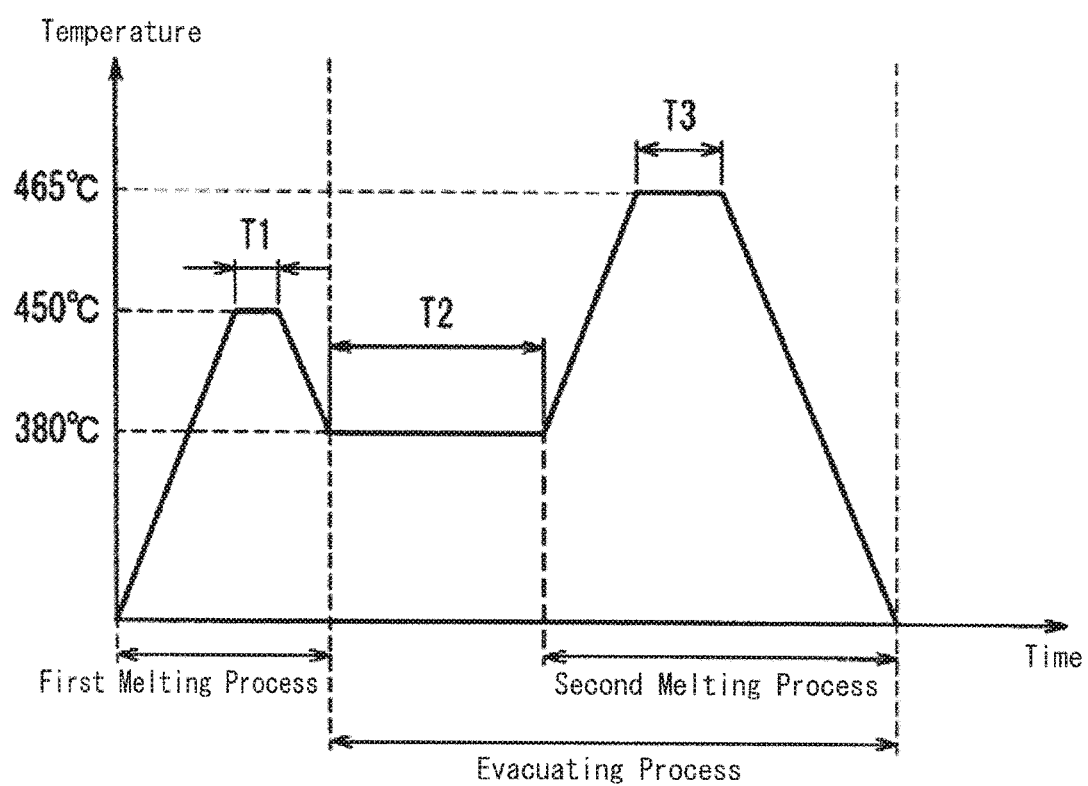
FIG. 5 is a diagram illustrating examples of configuration conditions of a fusing process and an evacuating process in the production method of multiple panes of the first embodiment.

FIG. 5 is a diagram illustrating examples of configuration conditions of a melting process of melting the frit seal 4 and the partition 5 and an evacuating process of evacuating air from the space between the pair of glass panels 2 and 3 in the production method of multiple panes of the present embodiment.

As shown in FIG. 5, in the first melting process, first a desired temperature of a furnace is set to a temperature (e.g., 450° C.) higher than a softening point temperature of 434° C. of the glass frit used for the frit seal 4 and the partition 5. In this process, the frit seal 4 starts to melt, and thus the peripheries of the pair of glass panels 2 and 3 are hermetically bonded, and thereby the space A to be hermetically enclosed is formed between the pair of glass panels 2 and 3. Simultaneously, the partition 5 also starts to melt, and thus the partition 5 is welded to the glass panel 2 and the glass panel 3. However, the furnace temperature in the first melting process is set to a temperature of 450° C. which is slightly higher than the softening point temperature of the glass frit, and therefore the partition 5 is not greatly changed in shape, and thus the slit 5a has not been closed yet. In the first melting process, it is important that the slit 5a formed in the partition 5 has not been closed yet. Hence, the furnace temperature is kept at the maximum temperature of 450° C. in the first melting process, and a continuous period (required period) of melting is set to an extent that the slit 5a of the partition 5 is not closed. In the present embodiment, the continuous period (T1) in this first melting process is 10 minutes, for example.

Subsequently, as shown in FIG. 5, the evacuating process begins. In the evacuating process, the temperature inside the furnace is temporarily decreased down to a temperature (e.g., 380° C.) equal to or less than the melting-point temperature of 434° C. of the glass frit and simultaneously air is evacuated from the space A with a vacuum pump. During the evacuating process, the temperature inside the furnace is set to be lower than the softening point temperature, and thus the frit seal 4 and the partition 5 are not melted and changed in shape.

In view of ensuring the thermally insulating properties necessary for the multiple pane, it is preferable that the degree of vacuum of the space A be equal to or less than 0.1 Pa. The thermally insulating properties of the multiple pane increase with an increase in the degree of vacuum. However, to obtain the higher degree of vacuum, it is necessary to improve the performance of the vacuum pump and increase the evacuation period, and this may cause an increase in the production cost. Hence, in view of the production cost, it is preferable that the degree of vacuum be kept to a level sufficient to ensure the properties necessary for the multiple pane and be not increased more than necessary.

Note that, when the desired temperature in the evacuating process is lowered intentionally, it takes time to increase the temperature to a temperature for the second melting process described later. Hence, in view of shortening a necessary period for the whole of the melting process and the evacuating process, it is effective to set the desired temperature at the time of starting the evacuating process to a temperature slightly lower than the softening point temperature of the glass frit. For example, when the desired temperature of the evacuating process is 420° C. and the continuous period (T2) is 120 minutes, the space inside the multiple pane can be evacuated effectively.

Next, as shown in FIG. 5, while the space A is evacuated, the temperature of the furnace is increased up to 465° C. for the second melting process. When the evacuation of the space A continues, the atmospheric pressure may cause external force narrowing the gap between the pair of glass panels 2 and 3 and consequently, the glass panel 2 and the glass panel 3 are pressed so that the distance therebetween is decreased. In the multiple pane produced by the present embodiment, by way of example, the spacers 6 with the height of 100 μm are disposed, and thus the distance between the pair of glass panels 2 and 3 is kept equal to the height of 100 μm of the spacers. The force causing a decrease in the distance between the glass panels 2 and 3 occurs, and therefore the frit seal 4 and the partition 5 which are melted are pressed from above and below. Therefore, in a plan view, the widths of the frit seal 4 and the partition 5 are increased. Hence, the pair of glass panels 2 and 3 are hermetically bonded firmly and successfully with the frit seal 4, and the slit 5a formed in the partition 5 as the air passage is narrowed and thus closed. When the slit 5a of the partition 5 is closed, the space A is divided into the outlet region B which is a space including the outlet 7 and the reduced-pressure region C which is a space other than the outlet region. Note that, in the second melting process, mechanical pressing force may be applied to at least one of the glass panels to decrease the distance between the glass panels, if necessary.

In the second melting process, it is important that as described above, the partition 5 is sufficiently melted and thus the slit 5a serving as the air passage is successfully closed. By way of one example, when the continuous period (T3) at the desired temperature of 465° C. in the second melting process is 30 minutes, it is possible to successfully divide by the partition 5 the space A into the outlet region B and the reduced-pressure region C.

Figure 6:
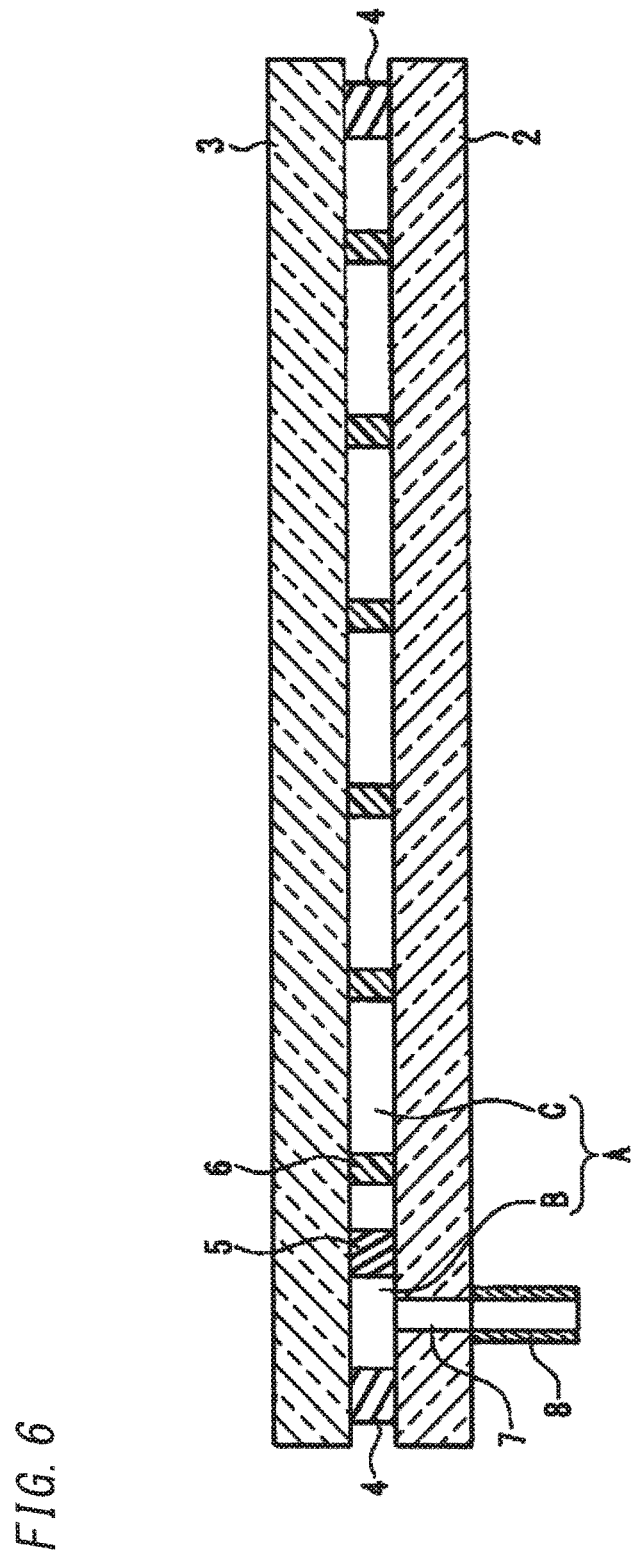
FIG. 6 is a section which relates to the production method of multiple panes of the first embodiment and illustrates a state in which a space between paired glass panels is divided by the region forming member.

As shown in the section of FIG. 6, the distance between the glass panel 2 and the glass panel 3 is set to the predetermined distance determined by the spacer 6, and the slit 5a of the partition 5 is wholly closed and thus the space A is perfectly divided into the outlet region B and the reduced-pressure region C. Subsequently, temperature of the furnace is decreased and then the multiple pane is taken out from the furnace.

As described above, the space A is made be in the reduced-pressure state by evacuating air from the space A through the outlet 7 of the glass panel 2, and subsequently the space A is divided by the partition 5 into the outlet region B and the reduced-pressure region C. In the state shown in FIG. 6, the reduced-pressure region C is kept in the reduced-pressure state. In this state shown in FIG. 6, the evacuation pipe 8 is removed and thereby the finished product of the multiple pane 1 described with reference to FIG. 1 and FIG. 2 can be obtained. Note that, after the evacuation pipe 8 is disconnected from the vacuum pump, the inside of the outlet region B has the atmospheric pressure as with the outside. Hence, it is easy to remove the evacuation pipe 8.

Figure 7:
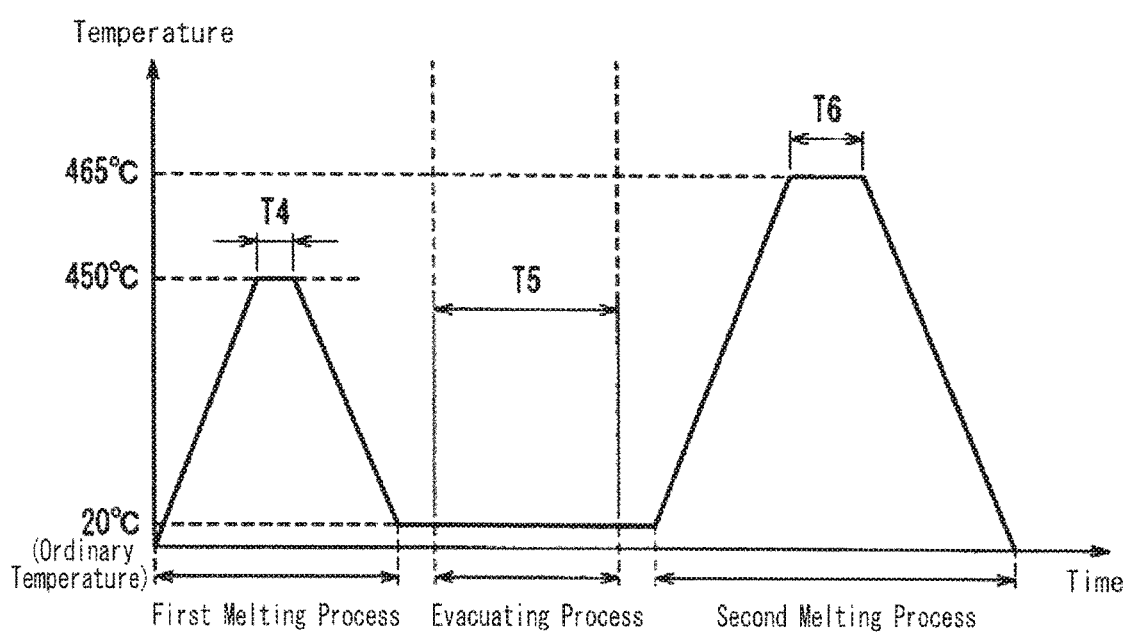
FIG. 7 is a diagram illustrating other examples of the configuration conditions of the fusing process and the evacuating process in the production method of multiple panes of the first embodiment.

FIG. 7 shows other configuration conditions of the melting process of melting the frit seal 4 and the partition 5 and the evacuating process of evacuating air from the space A between the pair of glass panels 2 and 3 in the production method of multiple panes of the present embodiment. The configuration conditions shown in FIG. 7 are different from the configuration conditions shown in FIG. 5 in that the temperature of the multiple pane is decreased down to the room temperature after the first melting process.

First, the first melting process of melting the frit seal 4 to hermetically bond the pair of glass panels 2 and 3 so as to form the space A is performed. The configuration condition of the first melting process can be same as that shown in FIG. 5, and thus the maximum achieving temperature is 450° C. higher than the softening point temperature 434° C. of the glass frit used for the frit seal 4 and the partition 5 and the continuous period (T4) is 10 minutes, by way of one example. Subsequently, the temperature of the multiple pane is decreased down to the room temperature by taking out the multiple pane from the furnace or the like.

Thereafter, at the room temperature, the evacuating process of evacuating air from the space A through the evacuation pipe 8 with the vacuum pump to obtain the space A with the predetermined degree of vacuum is conducted. The desired period (T5) in the evacuating process is 300 minutes, for example.

In the other configuration condition example shown in FIG. 7, at the end of the evacuation process, under a condition where the degree of vacuum of the space A is a predetermined value such as 0.1 Pa or less, sealing the tip of the evacuation pipe 8 to enclose the space A, so called tip-off is conducted. By doing so, even when the multiple pane in which the space A formed by the pair of glass panels has the predetermined degree of vacuum is detached from the vacuum pump, the space A can be kept in the reduced-pressure state.

After the evacuating process, the multiple pane in which the evacuation pipe 8 has been subjected to the tip-off is placed inside the furnace again, and the second melting process of the maximum temperature of 465° C. and the continuous period (T6) of 30 minutes is conducted, by way of one example. In the other configuration conditions shown in FIG. 7, the condition of the temperature of the furnace may be same as the temperature condition shown in FIG. 5, but in the second melting process, the evacuation of the space A is not conducted. As described above, in the case of the configuration condition example shown in FIG. 7, the evacuation is not conducted in the second melting process, however, since the evacuating process conducted at the room temperature, the space A in the reduced-pressure state has the pressure lower than the outside pressure. Hence, the external force is applied so as to decrease the distance between the pair of glass panels 2 and 3. As a result, like the configuration conditions shown in FIG. 5, in the second melting process, the frit seal 4 is sufficiently melted and thus the glass panels 2 and 3 are hermetically bonded firmly, and the slit 5a of the partition 5 is closed, and consequently the space A is divided into the outlet region B and the reduced-pressure region C.

Note that, when the melting process and the evacuating process under the other configuration conditions shown in FIG. 7 are conducted, the tip of the evacuation pipe 8 is subjected to the tip-off. Hence, even after the end of the second melting process, the outlet region B and the reduced-pressure region C each are kept in the reduced-pressure state. Thereafter, when the evacuation pipe 8 is removed, the outlet region B has the same pressure as the atmospheric pressure, while the reduced-pressure region C is kept in the reduced-pressure state. Consequently, the finished product of the multiple pane 1 shown in FIG. 1 and FIG. 2 can be obtained.

As described above, according to the production method using the other configuration conditions shown in FIG. 7, between the first melting process and the second melting process, the evacuating process is conducted under a condition where the temperature of the multiple pane is set to the room temperature. Hence, the melting process and the evacuating process can be conducted independently, and thus the furnace used in the melting process can be separate from the vacuum pump used in the evacuating process. As a result, the furnace can be simplified and downsized, and therefore the degree of sealing of the furnace can be improved, it is possible to reduce the necessary power consumption and shorten time necessary for increasing the temperature. Further, the vacuum pump can be disposed at a position far from the furnace having a high temperature, and hence there is no need to take action to prevent equipment for chucking a vacuum valve of the vacuum pump and/or the evacuation pipe from having high temperature, and therefore the production equipment can be simplified.

In contrast, in the second melting process, the space A is not being evacuated, and thus the external force causing a decrease in the distance between the pair of glass panels is weaker than that in the case of the configuration conditions shown in FIG. 5. Therefore, it is necessary to carefully control application status and viscosity of the glass frit for the frit seal 4 and the partition 5 so that after the second melting process the distance between the pair of glass panels 2 and 3 becomes the predetermined distance and the slit 5a of the partition 5 is closed to successfully divide the space A into the outlet region B and the reduced-pressure region C. Further, it is considered that mechanical pressing force may be applied to at least one of the glass panels to keep the distance between the glass panels to the predetermined distance, if necessary. Additionally, when the multiple pane is produced under the configuration conditions shown in FIG. 7, in the step of removing the evacuation pipe 8, the outlet region B spatially connected to the evacuation pipe 8 is kept in the reduced-pressure state. Therefore, it is necessary to pay attention to accurate and safe removal of the evacuation pipe 8.

As described above, according to the production method of multiple panes of the present embodiment, the slit 5a is provided to the partition 5 as the air passage, and the slit 5a is closed in the second melting process, and thereby the space A formed between the pair of glass panels can be divided into the outlet region B and the reduced-pressure region C. In the present embodiment, an example in which one slit 5a is formed in the almost central part of the partition 5 is shown, however, when the slit 5a serving as the air passage is formed in the partition 5, the position of the slit, the number of slits and the like may be appropriately selected.

Further, the air passage formed in the partition 5 is not limited to the slit.

Figure 8:
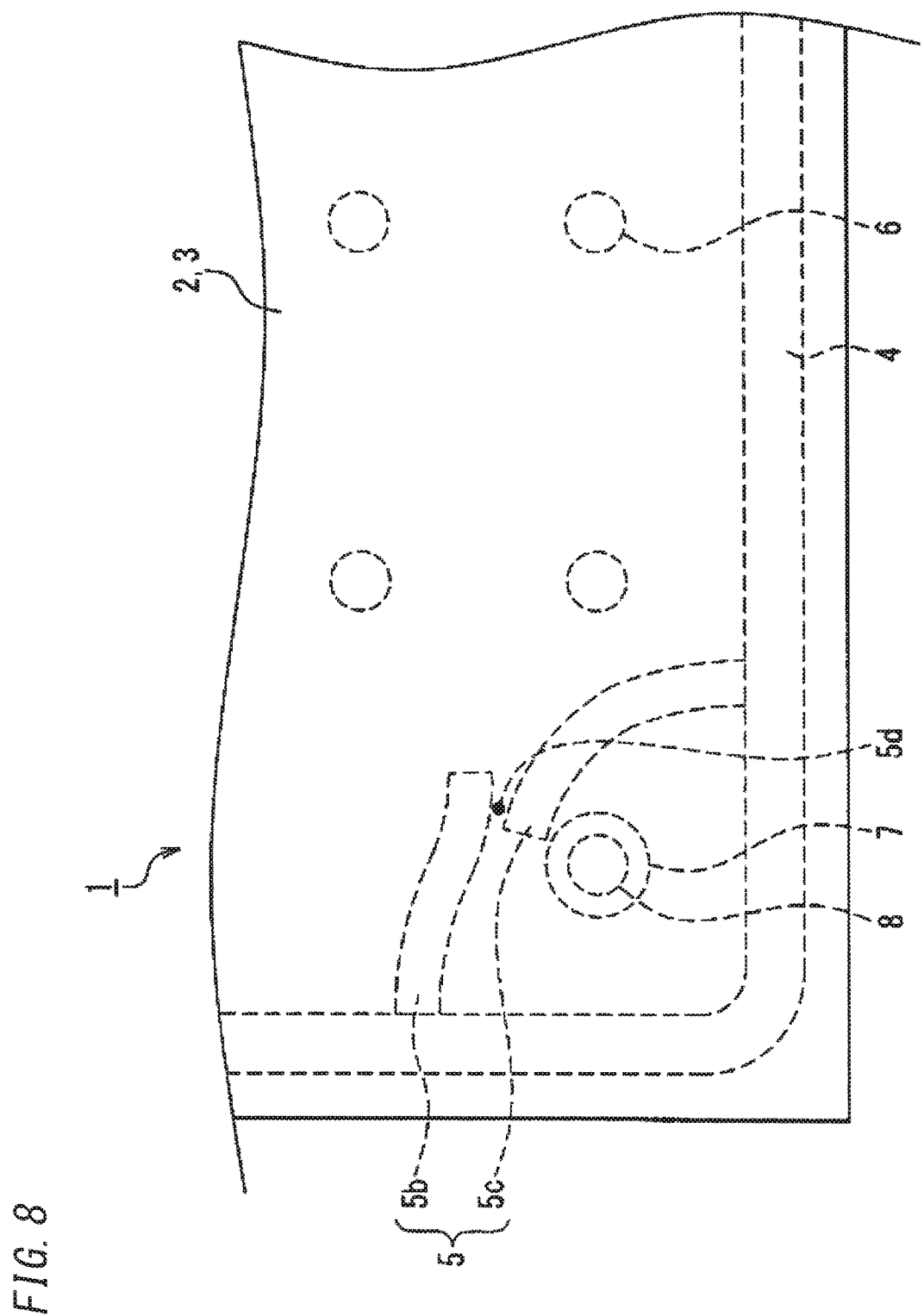
FIG. 8 is an enlarged plan illustrating a primary part of the first modification of the region forming member in the production method of multiple panes of the first embodiment.

FIG. 8 is an enlarged plan illustrating a primary part including the partition of the first modification exemplifying a configuration of the partition provided with an air passage different from the slit.

The partition 5 of the first modification shown in FIG. 8 includes two parts 5b and 5c. The parts 5b and 5c are connected to the frit seal 4 at their one ends, and include curved parts in different directions at the other ends opposite from the one ends connected to the frit seal 4. According to this structure, a gap 5d between the curved parts serves as an air passage interconnecting the outlet region on the outlet side and the reduced-pressure region in the space A.

The partition 5 is made of seal such as low-melting glass frit. The seal can be applied to the predetermined position in the surface 2a of the glass panel 2 facing the inside by controlling a position of an application nozzle which to discharge a paste of the seal from its tip. Hence, to form the slit 5a with the predetermined width which is an interval in the partition 5 formed continuously as shown in the planar configuration of FIG. 3, the nozzle is moved the predetermined distance while the discharge of the seal from the nozzle is tentatively stopped, and thereafter the discharge of the seal from the nozzle is started again. However, in some cases, it is difficult to accurately form the discontinuous partition including the slit with the predetermined width due to some limitations such as the viscosity of the paste and the application width of the partition. In contrast, according to the partition 5 of the modification shown in FIG. 8, opposite ends from the ends connected to the frit seal 4 are curved in different directions so as to form the gap between the opposite ends, and the gap 5d is used as the air passage. Therefore, the control of the application position of the partition 5 by the nozzle can be facilitated, and hence, there is an advantage that the partition 5 with the desired shape can be formed accurately.

Note that, the width of the gap 5d between the curved parts of the applied glass frit, the length of the overlap of applied regions in different two directions, and the formation widths of the partitions 5b and 5c with regard to the overlap can be appropriately selected in consideration of the viscosity and the application height of the glass frit, the width of the partition 5 fattened by pressing in the second melting process of melting the air passage by melting the partition, and the like. Further, with regard to the shape of the opposite ends of the parts of the partition 5 from the ends connected to the frit seal 4, for example, the opposite ends of the parts of the partition 5 may be formed as straight portions extending in different directions, and at least parts of the straight portions are arranged in substantially parallel at a predetermined distance. In summary, it is possible to use various configurations in which the partition formed continuously includes parts arranged at the predetermined distance, and the interval between the parts serves as the air passage to be closed when the partition is flattened by pressing in the second melting process.

Figure 9:
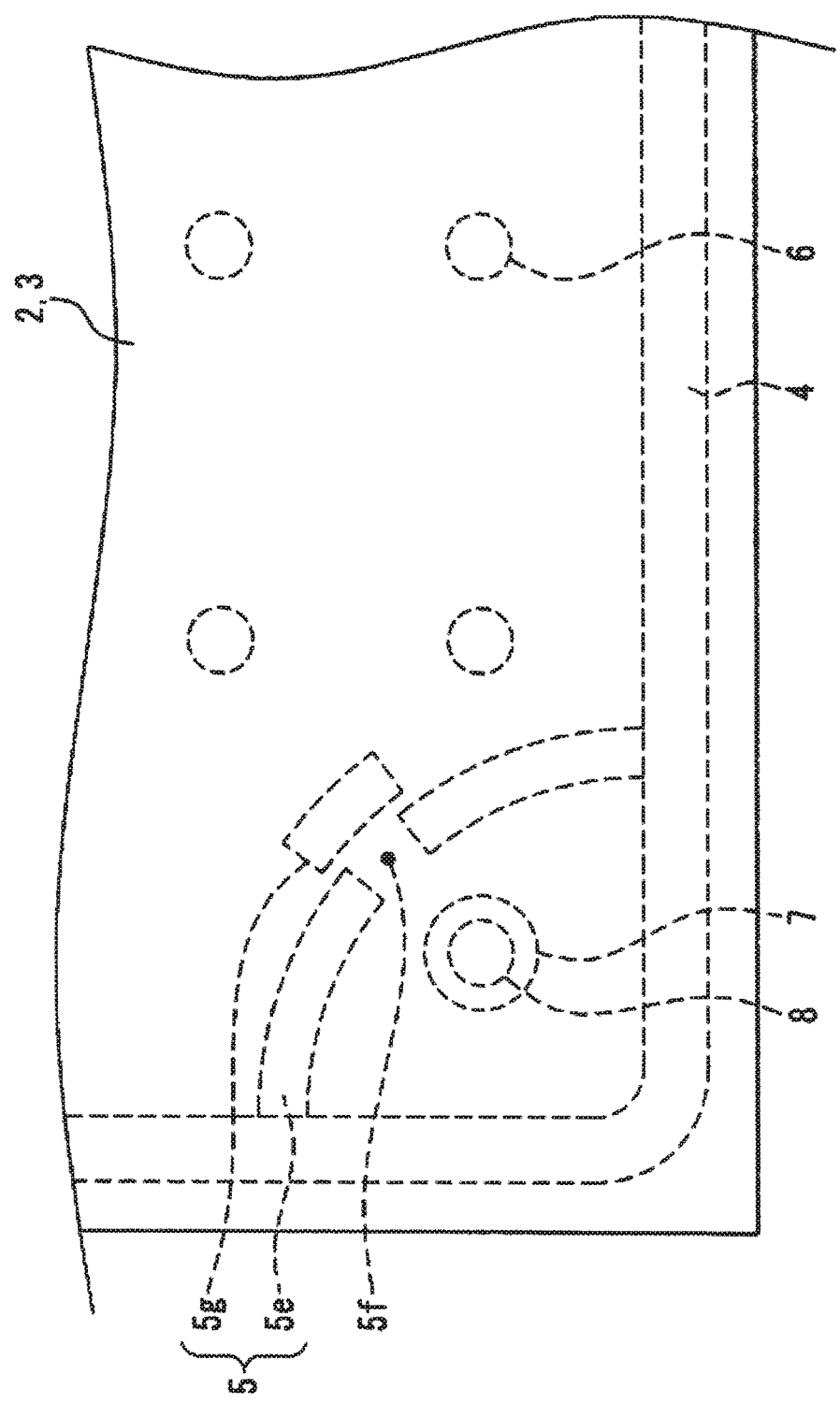
FIG. 9 is an enlarged plan illustrating a primary part of the second modification of the region forming member in the production method of multiple panes of the first embodiment.

FIG. 9 is an enlarged plan illustrating a primary part of the multiple pane including the partition of the second modification which exemplifies another configuration of the partition provided with the air passage.

The partition 5 of the second modification shown in FIG. 9 includes: two partial partitions 5e with one ends connected to the frit seal 4; an interval 5f defined by a gap between other ends of the two partial partitions 5e which are opposite from the one ends connected to the frit seal 4; and a sealing part 5g longer than the interval 5f formed on at least one of both sides of the interval 5f.

The partition 5 of the second modification shown in FIG. 9 includes at its central part the interval 5f with a predetermined length greater than the width of the slit 5a of the partition 5 shown in FIG. 3. By way of one example, the predetermined length is greater than the application width of the partial partition 5e.

In the partition 5 shown in FIG. 9, the interval 5f formed in the central part is formed to have a length greater than the width of the slit 5a shown in FIG. 3, and the sealing part 5g for closing the interval 5f is disposed in a vicinity of the interval 5f. The accuracy necessary for the length of the interval 5f is not so high. Hence, even when the application formation process of the partition 5 is simplified more than a process of forming the slit 5a shown in FIG. 3, it is possible to form the partition 5 including the air passage allowing successful division of the space A into the outlet region B and the reduced-pressure region C.

Note that, in the partition 5 of the second modification shown in FIG. 9, the length of the interval 5f, the length of the sealing part 5g, and the distance between the partial partition 5e between the sealing part 5g are appropriately selected in consideration of the material of the seal for the partition 5, the application formation method, the application height, the temperature conditions in the second melting process, the width of the partial partition 5e, and the like.

Figure 10:
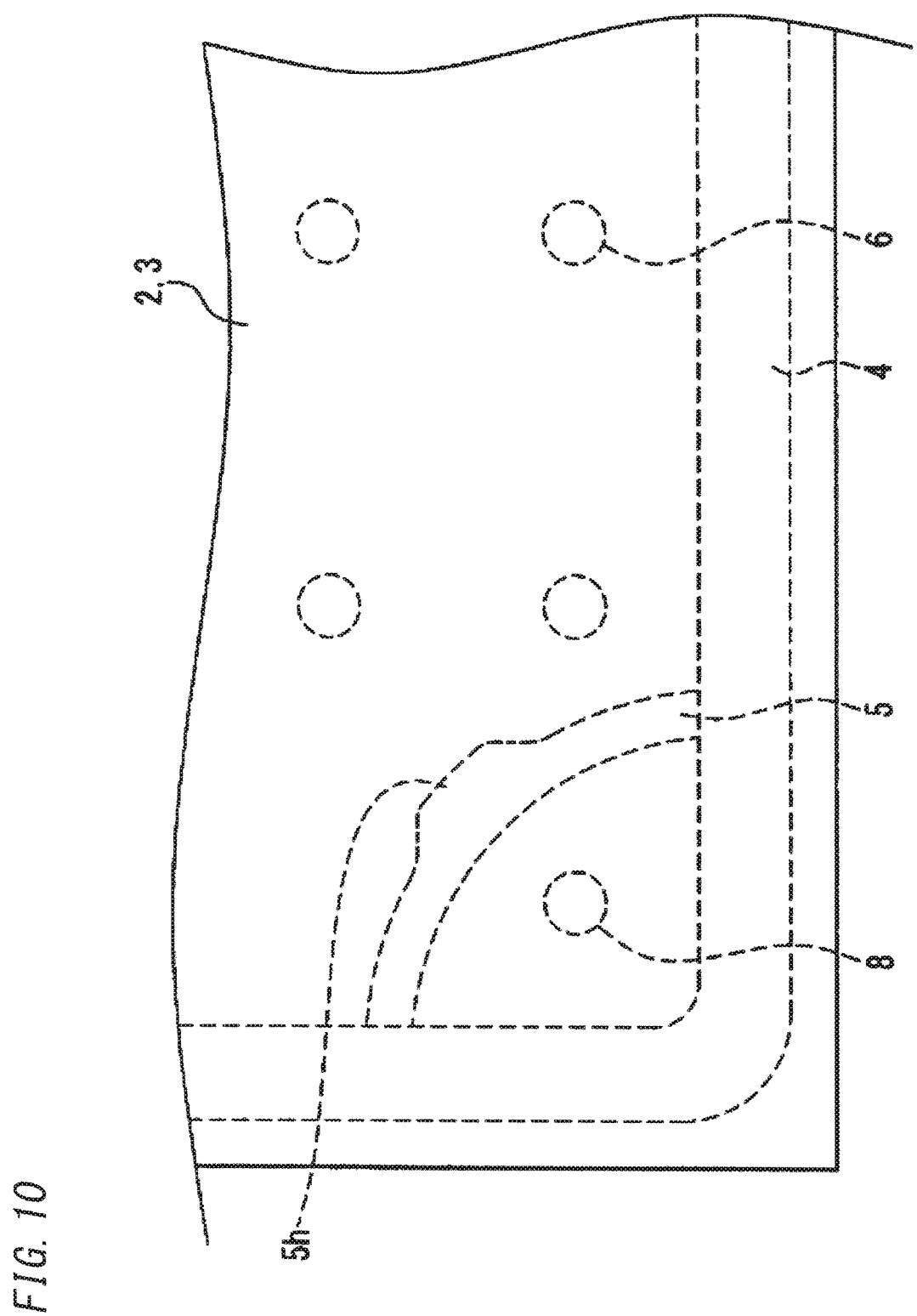
FIG. 10 is an enlarged plan illustrating a primary part of a finished product including the modification of the region forming member in the production method of multiple panes of the first embodiment.

In the case of using the partition of the first modification shown in FIG. 8 or the partition of the second modification shown in FIG. 9, when the air passage formed in the partition is closed to divide the space A into the outlet region B and the reduced-pressure region C, the partition 5 is wider at its part 5h resulting from the closure of the air passage, as shown in FIG. 10. When the width of the partition 5 is increased more than necessary, the partition 5 can be easily perceived when the finished product of the multiple pane 1 is viewed. Further, there may be a problem that when melted the partition 5 may spread and leak out through the outlet 7. For this reason, it is preferable that the width of the part 5h of the partition 5 in which the air passage is closed is sufficiently controlled by adjusting the condition for application and formation of the partition 5.

As described above, the production method of multiple panes according to the first embodiment of the present disclosure is described with reference to the instance where the frit seal serving as the hermetically-bonding member and the partition serving as the region forming member are made by use of the same low-melting glass frit.

However, in the production method of multiple panes of the present embodiment, the frit seal and the partition are not limited to being made of the same glass frit. For example, the partition serving as the region forming member may be made by using glass frit with a melting temperature higher than a melting temperature of the frit seal serving as the hermetically-bonding member, for example. In more detail, the glass frit used for the frit seal and the glass frit used for the partition have different melting temperatures, and further the heating temperature in the first melting process of melting the frit seal to hermetically bond the pair of glass panel is set to a temperature which is equal to or more than the melting temperature of the frit seal and is equal to or less than the melting temperature of the partition, and the heating temperature in the second melting process of melting the partition to divide the space A into the outlet region and the reduced-pressure region is set to a temperature which is more than the melting temperature of the partition. By doing so, it is possible to clearly distinguish by the temperature conditions the first melting process of melting the frit seal to form the predetermined space between the pair of glass panels from the second melting process of melting the partition to close the air passage to divide the space between the pair of glass panels into the outlet region and the reduced-pressure region.

Alternatively, the hermetically-bonding member and the region forming member may be made of seals which are other than glass frit and have different melting conditions. As with this case, the hermetically-bonding member and the region forming member are made of seals to be melted under different conditions, and only the hermetically-bonding member is melted in the first melting process and only the region forming member is melted in the second melting process. Therefore, it is possible to avoid unexpected situations where the region forming member is unfortunately melted in the first melting process, and the air passage is narrowed and thus the evacuation efficiency for the space is likely to decrease, and in the worst case the air passage is closed in the first melting process and thus the reduced-pressure region cannot have a sufficiently reduced pressure.

Note that, when each of the frit seal serving as the hermetically-bonding member and the partition serving as the region forming member is made of low-melting glass frit, the melting temperature of the glass frit can be adjusted by components, sizes, and contents of glass powder used for the glass frit and metal power contained in the glass frit, and/or adjusting concentration and content of a resin component used as a solvent.

Second Embodiment

The method of producing multiple panes of the second embodiment of the present disclosure is described with reference to the drawings.

The production method of multiple panes according to the second embodiment is different from the production method of multiple panes of the aforementioned first embodiment in that a formation height of a frit seal 4 serving as a hermetically-bonding member formed on a surface 2a of a rear glass panel 2 facing an inside is lower than a formation height of a partition 5 serving as a region forming member. Note that, in the following text relating to the present embodiment, components common to the present embodiment and the first embodiment are designated by the same reference signs, and detailed explanations thereof may be omitted.

Figure 11:
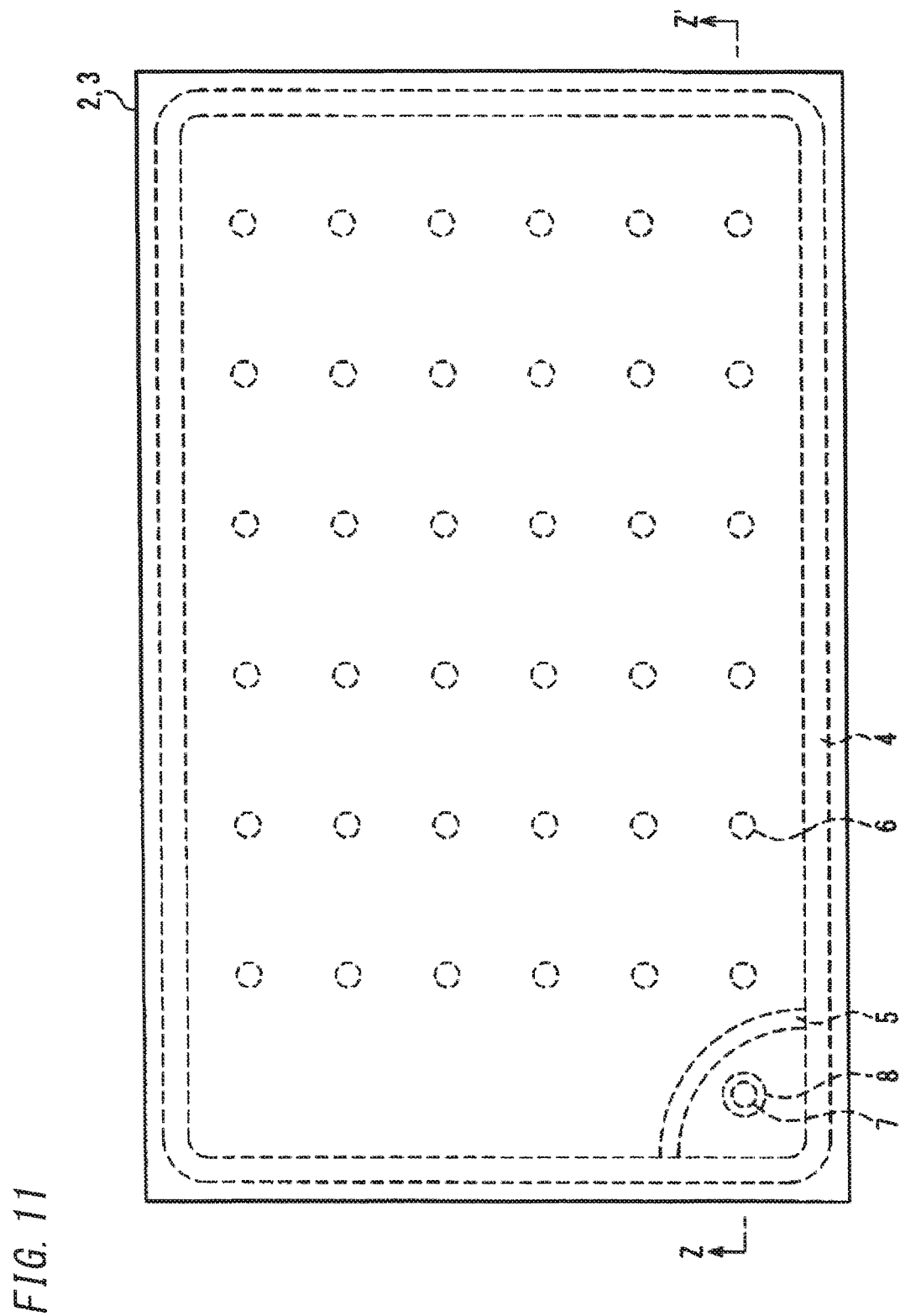
FIG. 11 is a plan which relates to the production method of multiple panes of the second embodiment and illustrates a state in which a hermetically-bonding member and a region forming member have not been melted yet.
Figure 12:
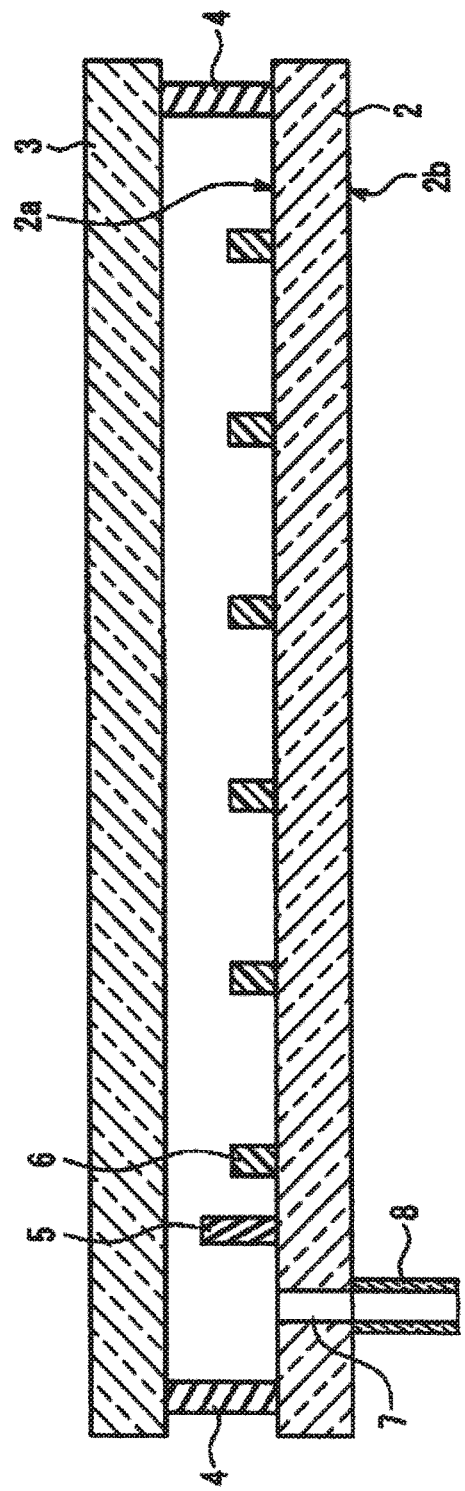
FIG. 12 is a section which relates to the production method of multiple panes of the second embodiment and illustrates the state in which the hermetically-bonding member and the region forming member have not been melted yet.

FIG. 11 and FIG. 12 are diagrams for describing the production method for the multiple pane of the second embodiment. FIG. 11 is a plan illustrating a state in which the rear glass panel 2 and the front glass panel 3 have not been hermetically bonded with the frit seal 4 yet. FIG. 12 is a section illustrating a state in which the rear glass panel 2 and the front glass panel 3 have not been hermetically bonded with the frit seal 4 yet. FIG. 12 is a view illustrating a sectional structure taken along line Z-Z' in FIG. 11. FIG. 11 is similar to FIG. 3 relating to the first embodiment. FIG. 12 is similar to FIG. 4 relating to the first embodiment.

As shown in FIG. 11 and FIG. 12, in the production method of multiple panes 1 of the present embodiment, the frit seal 4 in a frame shape serving as the hermetically-bonding member is applied on a peripheral portion of a front surface 2a of the rear glass panel 2, which is a surface facing the front glass panel 3. Further, the outlet 7 penetrating through the glass panel 2 is formed in a corner of the rear glass panel 2. Additionally, an evacuation pipe 8 is provided to a rear surface 2b of the glass panel 2 to be connected to the outlet 7.

The partition 5 serving as the region forming member is formed on the front surface 2a of the glass panel 2 so as to surround the outlet 7 together with the frit seal 4. In the present embodiment, the same low-melting frit glass is used for the frit seal 4 hermetically bonding the pair of glass panels 2 and 3 and the partition 5. However, an application height of the frit seal 4 is 1 mm by way of one example, and an application height of the partition 5 is 0.5 mm by way of one example, and in short, the application height of the partition 5 is smaller than the application height of the frit seal 4.

Note that, in the process of dividing the space between the glass panels 2 and 3 by the partition 5 described later, the application height of the frit seal 4 and the application height of the partition 5 can be appropriately selected to an extent that melting of the frit seal 4 and the partition 5 can be controlled. However, it is necessary that the application height of the partition 5 is greater than the height (e.g., 100 μm=0.1 mm) of the spacer 6 arranged at predetermined intervals on the surface 2a of the glass panel 2 facing the inside. For example, in a case where the frit seal 4 and the partition 5 are made of material which has relatively high fluidity when melted, the application height and width of the frit seal 4 are 0.5 mm and 5 mm, respectively and the application height and width of the partition 5 are 0.2 mm, and 3 mm, respectively, while the height of the spacer 6 is 0.1 mm. The paste used for forming the frit seal 4 and the partition 5 may be made of a bismuth-based seal frit paste, which is described in the text relating to the first embodiment, including: 60 to 75% of a glass component which is composed mostly of bismuth oxide and includes 70% or more of $Bi_2O_3$, 5 to 15% of each of $B_2O_3$ and ZnO, and 10% or less of other components; 20 to 30% of zinc-silica oxide; and 5 to 15% of a mixture of organic substances such as ethylcellulose, terpineol, and polyisoutyl methacrylate. This frit glass has a softening point of 434° C.

FIG. 12 shows an assembly where the frit seal 4 and the partition 5 have not been melted yet, and thus the front glass panel 3 is disposed on the frit seal 4 having the largest application height.

This assembly is subjected to the first melting process in the furnace under the configuration conditions shown in FIG. 5 described in the text relating to the first embodiment, for example. Through the first melting process, the frit seal 4 is melted and thus the glass panel 2 and the glass panel 3 are hermetically bonded. Further, through the first melting process, the frit seal 4 is melted, and thus the height of the frit seal 4 is decreased and the width of the frit seal 4 is increased. Hence, the distance between the front glass panel 3 and the rear glass panel 2 is slightly decreased. However, as described in the text relating to the first embodiment, the maximum achieving temperature in the first melting process is 450° C. which is slightly higher than the melting temperature of 434° C. of the low-melting glass frit for forming the frit seal 4 and the partition 5, and therefore changes in shape of the frit seal 4 and the partition 5 caused by melting are relatively small. Therefore, after the first melting process, a gap between the top of the partition 5 and the glass panel 3 caused by a difference in thickness between the frit seal 4 and the partition 5 has still existed, and thus the space formed between the pair of glass panels has been still one continuous space.

Next, the evacuation process shown in FIG. 5 is conducted, and therefore the space is in a reduced-pressure state in which the degree of vacuum is 0.1 Pa or less. As described above, the gap remains between the glass panel 3 and the top of the partition 5, and therefore the whole of the inside space A has the predetermined degree of vacuum.

Thereafter, as shown in FIG. 5, the second melting process having the achieving temperature of 465° C. which is higher than the achieving temperature of the first melting process is conducted. According to this second melting process, the frit seal 4 is further melted. The evacuation of the inside space A continues, and therefore intense external force causing a decrease in the distance between the glass panel 3 and the glass panel 2 acts, and consequently, the distance between the glass panels 2 and 3 is decreased until it is equal to the height of the spacer 6. As a result of this second melting process, the partition 5 is in contact with both the glass panel 2 and the glass panel 3, and therefore the space A is divided by the partition 5 into the outlet region B on the outlet side and the reduced-pressure region C other than the outlet region. Note that, also in the present embodiment, in the second melting process, mechanical pressing force may be applied to at least one of the glass panels to decrease the distance between the glass panels, if necessary.

The subsequent processes are same as those of the first embodiment. In other words, after the vacuum pump is detached and the pressure of the outlet region B becomes the atmospheric pressure like outside air, an evacuation pipe 8 is removed. In this regard, the reduced-pressure region C is kept in the reduced-pressure state, and thus it is possible to obtain the finished product of the multiple pane 1 shown in FIG. 1 and FIG. 2 like the production method of the first embodiment.

As described above, in the production method of multiple panes of the second embodiment, the application height of the partition 5 serving the region forming member is smaller than the application height of the frit seal 4 serving as the hermetically-bonding member. Therefore, the entire inside space formed between the pair of glass panels 2 and 3 hermetically bonded can be made be in the predetermined reduced-pressure state, and then divided into the outlet region and the reduced-pressure region.

Note that, in the description relating to the above present embodiment, the frit seal 4 and the partition 5 are made of the same low-melting glass frit, for example. However, also in the present embodiment, the frit seal 4 may be made of material having its melting temperature lower than the melting temperature of the low-melting glass frit for forming the partition 5.

Further, in the production method described in the text relating to the present embodiment, to successfully ensure the desired gap between the glass panel 3 and the top of the partition 5, the following method can be used. In this method, at least one stopper for keeping the distance between the glass panel 3 and the glass panel 2 not less than a predetermined value may be disposed outside a region on which the frit seal 4 is applied. The stopper is used in the first melting process to keep the predetermined distance, and thereafter in the second melting process the stopper is removed. Thereby, the distance between the glass panel 3 and the glass panel 2 becomes the predetermined distance determined by the spacer 6.

Further, like the first embodiment, the configuration conditions of the melting process and the evacuating process in the present embodiment may be the other configuration conditions, shown in FIG. 7 with regard to the first embodiment, where the temperature of the hermetically bonding glass is decreased down to the room temperature after the first melting process and then the second melting process is conducted after the evacuating process is conducted outside the furnace.

As described above, according to the production method of multiple panes of the present disclosure, the space formed between the pair of glass panels can be made be in the reduced-pressure state, and thereafter divided by the region forming member into the outlet region including the outlet and the reduced-pressure region other than the outlet region. Hence, it is possible to produce by a simplified process, a multiple pane which includes the reduced-pressure region and therefore can have the same properties as a multiple pane having the inside space with the reduced pressure, and nevertheless does not include the evacuation pipe which is a protrusion protruded from a glass panel. Particularly, it is obvious that by making the outlet region smaller as possible and the reduced-pressure region larger as possible the multiple pane with superior advantageous effects given by the production method according to the above present disclosure can be obtained.

Note that, in the above description, the hermetically-bonding member and the region forming member are made of material which melts and changes its shape when heated, such as glass frit. However, the hermetically-bonding member and the region forming member may be made of various types of materials which solidify into a predetermined shape in response to stimuli such as rays of light such as ultraviolet rays. In this case, a high temperature process including the first melting process and the second melting process as described in the text relating to the above present embodiment is unnecessary, and production equipment for multiple pane can be greatly simplified.

Further, in the text relating to the aforementioned first embodiment, the air passage formed in the region forming member is exemplified by an air passage making planar separation such as a slit and an interval between parts of the region forming member. However, depending on material of the region forming member and methods of changing in shape and solidifying the material, the air passage may be constituted by a through hole penetrating through the region forming member.

Further, with regard to the production methods of multiple panes of the first embodiment and the second embodiment, in the examples described with referring to with reference to FIG. 5 and FIG. 7 for the configuration conditions of the melting process and the evacuating process, the temperature of the hermetically bonded glass panels is decreased temporally after the first melting process and then the evacuating process is conducted. However, in the production method of multiple panes of the present disclosure, it is possible to use configuration conditions where after the first melting process, the temperature of the pair of glass panels hermetically bonded is not lowered but is kept or is increased and then the evacuating process is conducted and thereafter the second melting process using higher temperature than the first melting process is conducted. By doing so, it is possible to shorten lead time for the melting process and the evacuating process. Note that, to perform the evacuating process without decreasing the temperature of the hermetically bonded glass panels, it is very important that the reduced-pressure region formed by dividing the space between the pair of glass panels is made be in a sufficiently reduced pressure state by accurately controlling the timing of closing the air passage formed in the region forming member.

Further, in the production method of multiple panes of the first embodiment and the second embodiment, with regard to a case where the partition serving as the region forming member is made of material with a different melting point from material of the hermetically-bonding member or has a different application height from the frit seal, an example in which part is constituted by the region forming member in the same state except the hermetically-bonding member disposed at the peripheries of the pair of glass panels is described. However, in the production method of multiple panes of the present disclosure, in order to maintain the inside space A as one continuous space after completion of the first melting process, the region forming member may be made so that one part of the region forming member is made of material with a different melting point from material of the hermetically-bonding member and the air passage is formed in this part and another part of the region forming member is made of the same material as the hermetically-bonding member. Further, in a similar manner, the region forming member may have one part with a smaller application height than the hermetically-bonding member and another part with the same application height as the hermetically-bonding member. Further, the material and the application height of the region forming member may be different from those of the hermetically-bonding member.

Figure 13:
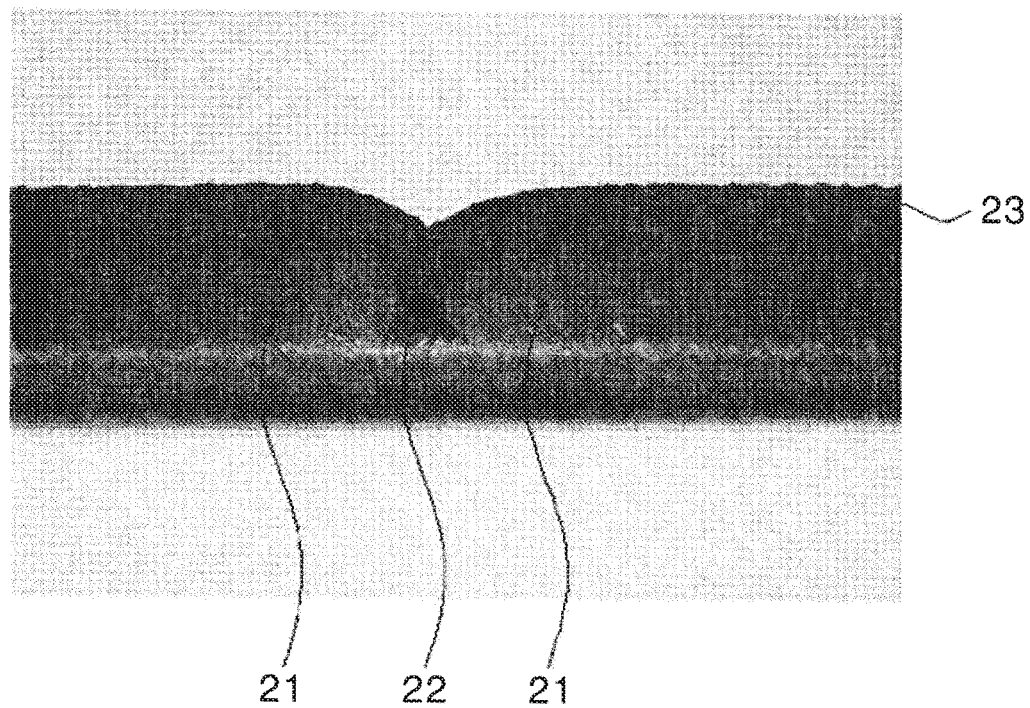
FIG. 13 is a diagram illustrating a difference in appearance between an applied part and a melted and spread part of the region forming member.

FIG. 13 is a diagram illustrating the state of the region forming member of the finished product of the multiple pane produced by the production method according to the present disclosure.

FIG. 13 shows a photograph of a sample low-melting glass frit parts 21 arranged with a slit 22 with a predetermined length in-between are melted in the melting process and thereby slit is closed by melted part 23. In more detail, the low-melting glass frit parts are made of the paste described in the texts relating to the first and second embodiments, the application width is 5 mm, the slit width is 2 mm, and the application height is 0.5 mm. The sample was prepared by subjected to the melting process at 465° C. for 30 minutes in a furnace. Note that, the glass panels are two soda-lime glass panels with a thickness of 3 mm. In the melting process, external force causing a decrease in a distance between the pair of glass panels was not applied. Further, in the sample shown in FIG. 13, to facilitate taking photographs, the glass frit parts 21 with the slit 22 in-between were formed at peripheral regions of the glass panels.

As shown in FIG. 13, after melting of glass frit, the part 21 which is preliminarily formed by application has a relatively light color, and the part 23 which is melted and is solidified has a relatively dark color, and thus it is possible to distinguish the part 21 from the part 23. As a result of check by the present inventors with microscopes, it is acknowledged that the part of low-melting glass preliminarily applied shows a pattern of fine particles whereas the part low-melting glass which was melted and flowed once shows a pattern of fine lines. It is considered that these patterns are formed by glass fine particles and pores contained in the low-melting glass frit paste. Further, it is considered that a difference between these patterns depends on amounts of movement from the original application position. It is considered that such a difference in surface states causes a difference in color which can be observed with naked eyes.

As apparent from the above, with regard to the low-melting glass frit, the part which was preliminarily applied and the part which was once melted and liquefied and again was solidified are in different surface states. Even in the finished product of the multiple pane, the difference between the surface states appears as a difference in color by irradiation with particularly intense light. Further, in a case where the parts of low-melting glass frit have different application heights, such a difference between the parts may appear as a difference in the section of the finished product, and especially appear as a difference in a width of the section or the degree of spread of a portion in contact with the glass panel. As understood from the above, the multiple pane produced by the production method of multiple panes of the present disclosure can be identified from multiple panes produced by other methods, based on whether the multiple pane includes the outlet region with the external pressure and the reduced-pressure region kept in the reduced-pressure state, and observation of the state of the region forming member between the two regions.

Further, a method of melting the hermetically-bonding member and the region forming member may include laser sealing of fusing particular parts of the hermetically-bonding member and the region forming member by heating with laser, in addition to a method of placing the whole of glass panels inside the furnace as described in the texts relating to the embodiments, for example. According to a method of fusing particular parts of the hermetically-bonding member and the region forming member by applying predetermined heat from outside by laser sealing or other method, it is easy to selectively melt the hermetically-bonding member and the region forming member at predetermined regions. Hence, it can be expected that melting control in the production process where only the hermetically-bonding member is melted in advance and then the region forming member is melted is successfully conducted. Further, in a case where the hermetically-bonding member is melted and bonded in the furnace and thereafter the inside space is evacuated and then the region forming member is melted by laser sealing so as to divide the inside space into the outlet region and the reduced-pressure region, it is possible to produce multiple pane at a lowered cost and with a simplified device.

Further, in the texts relating to the above embodiments, a method of disposing the spacers on the region surrounded by the hermetically-bonding member to keep the gap between the pair of glass panels is described. Alternatively, height keeping member corresponding to the spacer may be disposed at a region where the hermetically-bonding member is formed.

Figure 14:
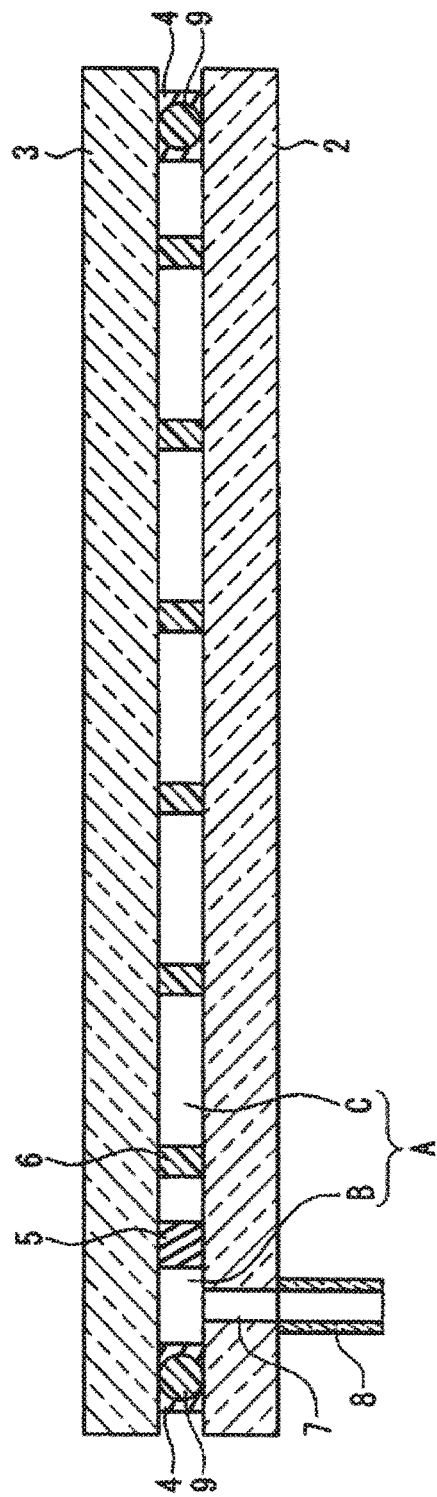
FIG. 14 is a section which relates to a case where a height keeping member is disposed at a portion on which the hermetically-bonding member is to be formed with regard to the production method of multiple panes of the present disclosure and illustrates a state in which the inner space is divided by fusing the region forming member.

FIG. 14 relates to a case where glass beads serving as the height keeping member with the same height as the spacer are disposed at a region where the frit seal serving as the hermetically-bonding member is formed, and shows a cross section illustrating a state in which the region forming member is melted and the inside space is divided. Like FIG. 6 used for explanation of the first embodiment, FIG. 14 shows the multiple pane in which the frit seal and the partition is melted perfectly once.

As shown in FIG. 14, with regard to the region where the frit seal 4 is formed, spherical glass beads 9 with a diameter equal to the height of the spacer 6 are disposed. In this case, it is possible to reduce a difference in the distance between the pair of glass panels 2 and 3 between a part at which the spacers 6 are disposed and a peripheral part at which the glass frit 4 is formed. By doing so, it is possible to successfully prevent a curve of the finished product of the pair of glass panels 2 and 3, and thus residual stresses of the glass panels 2 and 3 can be reduced and the strength of the multiple pane can be improved. Further, it is possible to avoid a problem where the distance between the glass panels 2 and 3 becomes smaller than the predetermined distance at the region at which the frit seal 4 is applied, and thus the frit seal 4 is pressed and flattened and thereby widened, and consequently the frit seal 4 can be easily perceived by a user, for example.

Note that, as a method of disposing the height keeping member at the region at which the hermetically-bonding member is formed, it is possible to use a method of mixing the glass beads 9 in the paste for application of the frit seal 4, and disposing the glass beads 9 at the same time of applying the frit seal 4. Further, the height keeping members may be disposed in advance at the region at which the frit seal 4 is formed, by a dispersion method similar to the method of disposing the spacers 6 or photolithography at the same time of disposing the spacers, and thereafter the frit seal 4 can be applied to cover the height keeping member.

The height keeping member described in FIG. 14 is disposed at the region at which the hermetically-bonding member is formed, and thus differently from the spacers, problem in which the height keeping member is perceived by a user and causes poor appearance of the multiple pane is less likely to occur. Hence, the height keeping member may be cylindrical member with the relatively large area or continuous member with a predetermined length in a peripheral direction of the glass panel like the partition. With regard to a method of disposing and forming such a height keeping member with the large area in a plan view, the aforementioned photolithography is preferable. Further, depending on the size of the multiple pane and the thickness of the glass panel, it is possible to produce the multiple glass which includes the height keeping member but does not include the spacers.

Further, in the texts relating to the above embodiments, an example in which one outlet formed at a vicinity of a corner of one glass panel is used as the outlet formed in the glass panel is described. However, the number of outlets is not limited to one. For example, in the case of the multiple pane with the large area, in view of evacuation efficiency, two or more outlets may be formed. In this case, two or more region forming members are disposed to surround the respective outlets, and then the inside space is divided into two or more outlet regions and one reduced pressure region or in some cases two or more reduced pressure regions. In a case where two or more outlets are formed, at least one outlet may be formed in each of glass panels.

Further, instead of forming the outlet in the glass panel, a predetermined gap is provided to the hermetically-bonding member formed between the peripheries of the glass panels, and air can be evacuated from the inside space by using this gap as the outlet. Particularly, in the production method of multiple panes of the present disclosure, the space between the pair of glass panels is divided by the region forming member, and thus there is no need to keep the outlet region in the reduced-pressure state with regard to the finished product. Therefore, for example, an interval similar to the interval described as the air passage of the region forming member may be formed in the hermetically-bonding member. Alternatively or additionally, a hollow cylindrical member may be disposed in the hermetically-bonding member instead of the spherical glass bead as the height keeping member so as to penetrate the hermetically-bonding member, and the inside space of the hollow cylindrical member may be used as the outlet. Note that, two or more outlets may be formed in the hermetically-bonding member, and alternatively, at least one outlet may be formed in each of the glass panel and the hermetically-bonding member.

Further, in the texts relating to the above embodiments, the method of connecting the evacuation pipe to the outlet and reduce the pressure of the inside space with the evacuation pipe is described. Use of the evacuation pipe facilitates connection with the vacuum pump, and thus the pressure of the space between the pair of glass panels can be reduced by a conventional evacuation method. However, the evacuation pipe is dispensable for evacuating the space between the pair of glass panels. For example, by hermetically connecting the vacuum pump to the hermetically bonded glass panels with a ring member with predetermined flexibility allowing the ring member to be in close contact with a surface of the glass panel at a vicinity of a part in which the outlet is formed, the inside space can be made be in the reduced-pressure state without using the evacuation pipe.

Further, in the multiple pane produced by the production method of multiple panes of the present disclosure, already established techniques of multiple panes such as forming functional films made of organic or inorganic material in order to give various types of optical functions such as reflection prevention and absorption of ultraviolet or thermally insulating properties to the glass panels can be added or applied. For example, by coating a front surface or a rear surface of at least one of the glass panels constituting the multiple pane with a thin film made of oxide such as tin oxide ($SnO_2$), indium tin oxide (ITO), and zinc oxide by a conventional method such as CVD (chemical vapor deposition) or a film of silver and oxide layers stacked alternately by a sputtering device, an infrared reflection film reflecting a large amount of light in an infrared region can be provided, and thus the thermally insulating properties of the multiple pane can be improved. Further, in this case, when the space has a hollow structure, or is of low thermal conductive material, it is possible to obtain the multiple pane with higher thermally insulating properties.

Further, it is possible that a getter member for improving a degree of vacuum is disposed in an inside space A of a multiple pane. Further, a multiple pane with a curved shape as a whole can be realized by use of curved glass panels curved in one direction or two or more directions as glass panels constituting a multiple pane.

Furthermore, it is possible to form a multiple pane in which three or more glass panels are stacked at predetermined intervals as a whole by replacing at least one of the pair of glass panels by another multiple pane. In this case, it is sufficient that at least one part of a stacked multiple pane in the thickness direction may be a multiple pane produced by the production method of the present disclosure. Therefore, a multiple pane produced by the production method of the present disclosure may be used in various ways, and for example, a multiple pane where a space between glass panels is filled with inert gas, a multiple pane produced by the production method of the present disclosure or another method, or a multiple pane in which glass panels are stacked at predetermined intervals but spaces therebetween have atmospheric pressure may be stacked on a multiple pane produced by the production method of the present disclosure.

The multiple panes produced by the production method of multiple panes of the present disclosure as described above have high thermally insulating effects, and can be preferably applied to window panes as eco-glass easy in handling. Further, for example, when multiple panes produced by the production method of multiple panes of the present disclosure are disposed in doors of refrigerators and freezers, the multiple panes have high thermally insulating effects, and thus allow check of insides of refrigerators and freezers without interfering functions of refrigerators and freezers. Hence, it is expected that the multiple panes are used in household and business.

Note that, techniques of dividing the glass panel while keeping the evacuated space in the reduced-pressure state in accordance with the present disclosure can be applied to, in addition to multiple panes, display devices prepared by evacuating predetermined spaces, such as plasma display panels and fluorescent indication devices, and it is possible to produce finished products of display devices devoid of protrusions such as evacuation pipes like products of the present disclosure.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

As described above, it is possible to produce multiple panes easy in handling in a simplified manner, and therefore the production method of multiple panes of the present disclosure is useful.

What is claimed is:

1. A production method of multiple panes comprising:
    a first melting process of setting a treatment temperature to a first temperature causing melting of a hermetically-bonding member to thereby hermetically bond, with the hermetically-bonding member, peripheries of paired glass panels disposed facing each other at a predetermined distance to form a space to be hermetically enclosed between the glass panels;
    an evacuating process of evacuating air from the space through an outlet to make the space be in a reduced-pressure state while keeping the treatment temperature lower than the first temperature; and
    a second melting process of setting, while the space is being evacuated after the space is made to be in the reduced-pressure state, the treatment temperature to a second temperature higher than the first temperature, causing melting of a region forming member inside the space to thereby divide the space by the region forming member into an outlet region including the outlet and a reduced-pressure region other than the outlet region,
    wherein the hermetically-bonding member and the region forming member are made by use of the same glass frit.

2. The production method of multiple panes of claim 1, wherein:
    the region forming member includes an air passage interconnecting the outlet region and the reduced-pressure region; and
    after the space is in the reduced-pressure state, the space is divided into the outlet region and the reduced-pressure region by closing the air passage.

3. The production method of multiple panes of claim 2, wherein:
    the air passage is an opening in the region forming member; and
    after the space is in the reduced-pressure state, the opening is closed by melting the region forming member.

4. The production method of multiple panes of claim 1, wherein a formation height of the region forming member before being melted is less than a formation height of the hermetically-bonding member before being melted.

5. The production method of multiple panes of claim 4, wherein after the space is made to be in the reduced-pressure state after the pair of glass panels are hermetically bonded by melting the hermetically-bonding member, the space is divided into the outlet region and the reduced-pressure region by the region forming member by decreasing the distance between the pair of glass panels.

6. The production method of multiple panes of claim 1, wherein a time for melting the region forming member is longer than a time for melting the hermetically-bonding member.

7. The production method of multiple panes of claim 1, wherein:
    after the space is formed by conducting melting inside a furnace to melt the hermetically-bonding member, and subsequently the space is made to be in the reduced-pressure state after the glass panels are taken out from the furnace, the space is divided into the outlet region and the reduced-pressure region by conducting again melting inside the furnace to melt the region forming member.

8. The production method of multiple panes of claim 1, wherein the outlet is formed in at least one of the pair of glass panels.

9. The production method of multiple panes of claim 1, wherein:
    the space is made to be in the reduced-pressure state by use of an evacuation pipe connected to the outlet; and
    the evacuation pipe is removed after the space is divided into the outlet region and the reduced-pressure region.

10. The production method of multiple panes of claim 1, wherein a spacer for keeping a gap between the pair of glass panels is disposed on a surface of at least one of the pair of glass panels.

11. The production method of multiple panes of claim 1, wherein glass beads for keeping a gap between the pair of glass panels are disposed at a portion on which the hermetically-bonding member is to be formed.

12. The production method of multiple panes of claim 10, wherein the spacer is formed by photolithography.

13. The production method of multiple panes of claim 11, wherein the glass beads are formed by photolithography.

* * * * *